(12) United States Patent
Wu et al.

(10) Patent No.: US 9,633,104 B2
(45) Date of Patent: Apr. 25, 2017

(54) METHODS AND SYSTEMS TO OPERATE ON GROUP-BY SETS WITH HIGH CARDINALITY

(71) Applicant: SAS INSTITUTE INC., Cary, NC (US)

(72) Inventors: Xunlei Wu, Cary, NC (US); Oliver Schabenberger, Cary, NC (US)

(73) Assignee: SAS Institute Inc., Cary, NC (US)

( * ) Notice: Subject to any disclaimer, the term of this patent is extended or adjusted under 35 U.S.C. 154(b) by 456 days.

(21) Appl. No.: 14/270,297

(22) Filed: May 5, 2014

(65) Prior Publication Data

US 2014/0330827 A1    Nov. 6, 2014

Related U.S. Application Data

(60) Provisional application No. 61/819,074, filed on May 3, 2013.

(51) Int. Cl.
G06F 17/30    (2006.01)

(52) U.S. Cl.
CPC .. *G06F 17/30598* (2013.01); *G06F 17/30536* (2013.01); *G06F 17/30584* (2013.01)

(58) Field of Classification Search
CPC ......... G06F 17/30598; G06F 17/30536; G06F 17/30584
See application file for complete search history.

(56) References Cited

U.S. PATENT DOCUMENTS

| | | | | |
|---|---|---|---|---|
| 5,511,190 A | * | 4/1996 | Sharma | G06F 17/30489 |
| 5,655,080 A | * | 8/1997 | Dias | G06F 9/5027 709/202 |
| 5,960,435 A | * | 9/1999 | Rathmann | G06F 17/30569 |
| 6,263,345 B1 | * | 7/2001 | Farrar | G06F 17/30454 700/110 |
| 6,430,550 B1 | * | 8/2002 | Leo | G06F 17/30445 707/623 |
| 6,477,525 B1 | * | 11/2002 | Bello | G06F 17/30457 |
| 6,519,604 B1 | * | 2/2003 | Acharya | G06F 17/30536 707/738 |

(Continued)

OTHER PUBLICATIONS

SQL Group by Statement from http://www.w3schools.com/sql/sql_groupby.asp 3 pages.

*Primary Examiner* — James E Richardson
(74) *Attorney, Agent, or Firm* — Kilpatrick Townsend & Stockton LLP

(57) ABSTRACT

This disclosure describes methods, systems, computer-readable media, and apparatuses for efficiently calculating group-by statistics. A data set that includes multiple entries is accessed. The multiple entries are grouped into group-by subsets which are formed on two or more group-by variables and which are subsets are subsets of the data set. Cardinality data is determined for each of the group-by subsets, wherein cardinality data represents a number of entries in a group-by subset. At least one summary of data in each of the group-by subsets is generated, wherein each of the summaries includes the cardinality data determined for the group-by subset. Objects for the group-by subsets are initialized such that the objects store the summaries. The objects may then be used to generate multiple statistical summaries of the data set.

30 Claims, 15 Drawing Sheets

(56) References Cited

U.S. PATENT DOCUMENTS

| | | | | |
|---|---|---|---|---|
| 7,933,867 B1* | 4/2011 | Gui | .................. | G06F 17/30592 |
| | | | | 707/624 |
| 2005/0234841 A1* | 10/2005 | Miao | ................. | G06F 17/30454 |
| 2013/0275364 A1* | 10/2013 | Wang | ................ | G06F 17/30592 |
| | | | | 707/602 |
| 2014/0280298 A1* | 9/2014 | Petride | ............. | G06F 17/30489 |
| | | | | 707/769 |

* cited by examiner

FIG. 9

AT FIRST GRID COMPUTING DEVICE 610-1:

| RED | TABLE | 5 | 20 |
|---|---|---|---|
| BLUE | CHAIR | 3 | 25 |
| BLUE | STOOL | 1 | 25 |
| BLUE | TABLE | 5 | 20 |
| RED | STOOL | 2 | 30 |
| BLUE | TABLE | 7 | 30 |
| RED | STOOL | 11 | 30 |
| RED | STOOL | 3 | 20 |
| BLUE | STOOL | 6 | 20 |
| BLUE | CHAIR | 8 | 15 |
| RED | CHAIR | 5 | 25 |
| BLUE | TABLE | 2 | 25 |
| BLUE | CHAIR | 4 | 20 |

620-1:

| RED | TABLE | 5 | 20 |
|---|---|---|---|

620-2:

| BLUE | CHAIR | 3 | 25 |
|---|---|---|---|
| BLUE | CHAIR | 8 | 15 |
| BLUE | CHAIR | 4 | 20 |

620-3:

| BLUE | STOOL | 1 | 25 |
|---|---|---|---|
| BLUE | STOOL | 6 | 20 |

620-4:

| BLUE | TABLE | 5 | 20 |
|---|---|---|---|
| BLUE | TABLE | 7 | 30 |
| BLUE | TABLE | 2 | 25 |

620-5:

| RED | STOOL | 2 | 30 |
|---|---|---|---|
| RED | STOOL | 11 | 30 |
| RED | STOOL | 3 | 20 |

620-6:

| RED | CHAIR | 5 | 25 |
|---|---|---|---|

AT SECOND SECOND COMPUTING DEVICE 610-2:

| RED | TABLE | 5 | 20 |
|---|---|---|---|
| RED | STOOL | 3 | 25 |
| BLUE | CHAIR | 6 | 25 |
| RED | CHAIR | 12 | 30 |
| BLUE | TABLE | 9 | 15 |
| RED | TABLE | 5 | 20 |
| BLUE | CHAIR | 8 | 15 |
| RED | STOOL | 1 | 25 |
| RED | TABLE | 5 | 20 |
| RED | STOOL | 2 | 30 |
| RED | TABLE | 7 | 30 |
| RED | STOOL | 11 | 30 |

620-7:

| RED | TABLE | 5 | 20 |
|---|---|---|---|
| RED | TABLE | 5 | 20 |
| RED | TABLE | 5 | 20 |
| RED | TABLE | 7 | 30 |

620-8:

| RED | STOOL | 3 | 25 |
|---|---|---|---|
| RED | STOOL | 1 | 25 |
| RED | STOOL | 2 | 30 |
| RED | STOOL | 11 | 30 |

620-9:

| BLUE | CHAIR | 6 | 25 |
|---|---|---|---|
| BLUE | CHAIR | 8 | 15 |

620-10:

| RED | CHAIR | 12 | 30 |
|---|---|---|---|

620-11:

| BLUE | TABLE | 9 | 15 |
|---|---|---|---|

AT THIRD GRID COMPUTING DEVICE 610-3:

| RED | STOOL | 3 | 20 |
|---|---|---|---|
| BLUE | STOOL | 6 | 20 |
| BLUE | CHAIR | 8 | 15 |
| RED | CHAIR | 5 | 25 |
| BLUE | TABLE | 2 | 25 |
| RED | CHAIR | 4 | 20 |
| RED | TABLE | 5 | 20 |
| RED | STOOL | 3 | 25 |
| BLUE | CHAIR | 6 | 25 |
| RED | CHAIR | 12 | 30 |
| BLUE | TABLE | 9 | 15 |

620-12:

| RED | STOOL | 3 | 20 |
|---|---|---|---|
| RED | STOOL | 3 | 25 |

620-13:

| BLUE | STOOL | 6 | 20 |
|---|---|---|---|

620-14:

| RED | TABLE | 5 | 20 |
|---|---|---|---|

620-15:

| BLUE | CHAIR | 8 | 15 |
|---|---|---|---|
| BLUE | CHAIR | 6 | 25 |

620-16:

| BLUE | TABLE | 9 | 15 |
|---|---|---|---|
| BLUE | TABLE | 2 | 25 |

620-17:

| RED | CHAIR | 5 | 25 |
|---|---|---|---|
| RED | CHAIR | 4 | 20 |
| RED | CHAIR | 12 | 30 |

METHODS AND SYSTEMS TO OPERATE ON GROUP-BY SETS WITH HIGH CARDINALITY

CROSS-REFERENCE TO RELATED APPLICATIONS

This is a non-provisional of and claims the benefit and priority under 35 U.S.C. §119(e) of U.S. Provisional App. No. 61/819,074, titled "Methods and Systems To Operate On Group-By Sets With High Cardinality Data". U.S. Provisional Application No. 61/819,074 was filed on May 3, 2013, and is incorporated by reference herein for all purposes.

TECHNICAL FIELD

Aspects of this disclosure generally relate to the efficient calculation and management of group-by statistics within large sets of data characterized by high cardinality.

BACKGROUND

In analyzing a very large data set, it is frequently desirable to calculate multiple statistics that characterize the data in the set. Calculating accurate summary statistics for a large data set often requires not only that every data point to be processed, but also requires significant amounts of memory for storing the results of intermediate computations, sorted subsets, and other elements and structures used during the process. When common algorithms are used to compute various statistics, the amount of processing and intermediate storage often times may change substantially as a function of the size and cardinality of the data set.

BRIEF SUMMARY

This disclosure describes a computer-program product that includes instructions operable to cause a data-processing apparatus to perform operations including accessing a data set that includes multiple entries, each of the entries including data corresponding to multiple variables, grouping the multiple entries into group-by subsets, wherein the group-by subsets are formed on two or more group-by variables, and wherein the group-by subsets are subsets of the data set, determining cardinality data for each of the group-by subsets, wherein cardinality data represents a number of entries in a group-by subset generating at least one summary of data in each of the group-by subsets, wherein each of the summaries includes the cardinality data determined for the group-by subset, initializing objects for the group-by subsets, wherein each of the objects include the cardinality data and the at least one summary, and wherein each of the objects includes values of the group-by variables used in forming the group-by subset, and generating multiple statistical summaries of the data set using the objects.

This disclosure also describes a computer-implemented method that comprises accessing a data set that includes multiple entries, each of the entries including data corresponding to multiple variables, grouping the multiple entries into group-by subsets, wherein the group-by subsets are formed on two or more group-by variables, and wherein the group-by subsets are subsets of the data set, determining cardinality data for each of the group-by subsets, wherein cardinality data represents a number of entries in a group-by subset generating at least one summary of data in each of the group-by subsets, wherein each of the summaries includes the cardinality data determined for the group-by subset, initializing objects for the group-by subsets, wherein each of the objects include the cardinality data and the at least one summary, and wherein each of the objects includes values of the group-by variables used in forming the group-by subset, and generating multiple statistical summaries of the data set using the objects.

Additionally, this disclosure describes a system that includes a processor configured to access a data set that includes multiple entries, each of the entries including data corresponding to multiple variables, group the multiple entries into group-by subsets, wherein the group-by subsets are formed on two or more group-by variables, and wherein the group-by subsets are subsets of the data set, determine cardinality data for each of the group-by subsets, wherein cardinality data represents a number of entries in a group-by subset generating at least one summary of data in each of the group-by subsets, wherein each of the summaries includes the cardinality data determined for the group-by subset, initialize objects for the group-by subsets, wherein each of the objects include the cardinality data and the at least one summary, and wherein each of the objects includes values of the group-by variables used in forming the group-by subset, and generate multiple statistical summaries of the data set using the objects.

BRIEF DESCRIPTION OF THE DRAWINGS

Aspects of the disclosure are illustrated by way of example. In the accompanying figures, like reference numbers indicate similar elements, and:

FIGS. 9-14 depict an example of a sequence of grid-computing system operations and procedures in which certain of the techniques disclosed herein are applied prior to statistically analyzing a data set.

DETAILED DESCRIPTION

Figure 1:
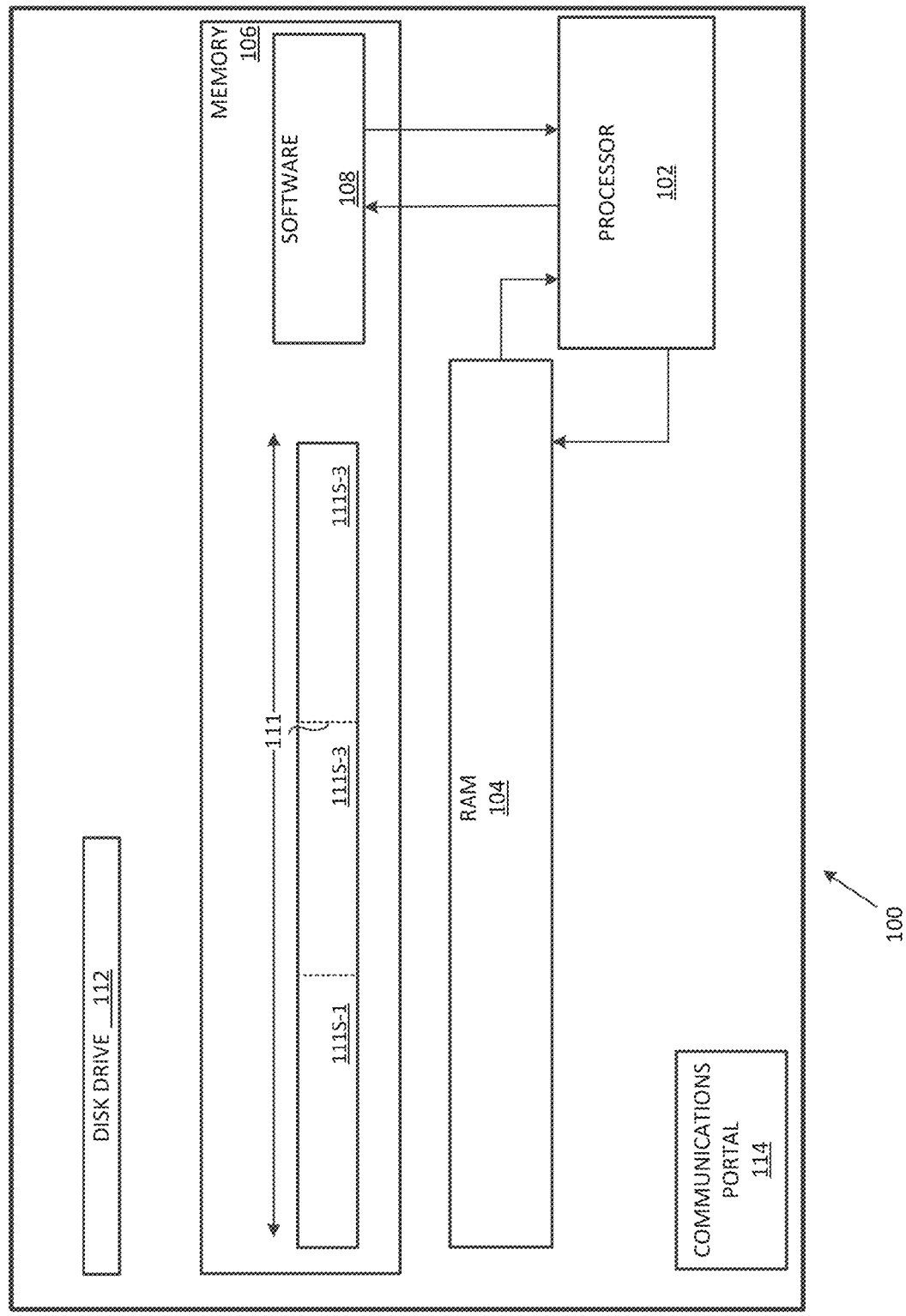
FIG. 1 is a block diagram with an example of a computing device configured to perform operations and use techniques described in this disclosure.

This disclosure describes a computing system capable of efficiently performing statistical analysis of large, multi-dimensional data sets. The computing system is configured to employ any number of methods that will be described in detail hereinafter. In general, these methods involve identifying multiple subsets of a data set, and generating statistical summaries of the individual subsets. Each of the statistical summaries is stored as part of an object that represents and is indexed to the underlying subset. Subsequently, any number of the subsets, or any combination of subsets, may be analyzed by aggregating or synthesizing applicable information stored by the objects relevant to the task. The system can be either a single processing apparatus with capabilities for performing in-memory or another type of processing, or a distributed computing system that involves multiple computing devices that are configured to perform in-memory or the other type of processing.

By using objects to represent and statistically summarize subsets, the computing system is able to effectuate up-front computation and storage of preliminary data that may serve as a computational building block in many subsequent statistical analyses. Once objects are created, the statistical summary information stored in the objects can be aggregated, combined, and/or synthesized as needed to obtain statistical summary information representative of the larger data set in its entirety, or to obtain statistical summary information representative of a union of subsets that a user wishes to analyze. At least because the statistical summary information that the objects store can be repeatedly used in statistical analyses, the statistical computing system is able to avoid computational redundancy and repeated sorting and aggregation of data set entries. Thus, the net efficiencies involved in using the objects can scale with the number of statistical analyses in which the objects are used.

Such techniques may be particularly relevant in the context of determining an average value, histogram, standard deviation, correlation, and/or a range of data observation values in a high-cardinality data set. The techniques are also applicable in computing top-k statistics, bottom-k statistics, distinct count statistics, as well as a number of other data set statistics, summaries, and representations. Furthermore, the techniques are relevant to many applications beyond the scope of statistical computation. For example, the techniques are applicable in the context of a filtering interface that allows a user to input criteria and see or examine a specified number of subsets or permutations of data that satisfy the criteria.

Because objects can represent subsets by statistically summarizing subset data entries, objects that represent large subsets can consume far less memory than the data entries of the subsets themselves. Thus, numerous subsets, both disjoint and intersecting, can be represented and statistically summarized by objects to provide more user flexibility in defining portions of a data set to be statistically analyzed or retrieved. Moreover, this effect can be achieved efficiently because of the minimal memory consumed by objects, and the fact that objects allow computed data to be reused.

Additionally, as will be described in greater detail to follow, the subsets may be defined in an intuitive manner so as to group together data entries that a user may wish to statistically analyze when analysis of a portion of a data set is desirable. By defining subsets and objects in this manner, the system can provide the user with a simple yet flexible and precise mechanism for selecting data for analysis, retrieval, or review from within a data set. Over the course of repeated statistical analyses, a user may make multiple distinct data selections by referencing various combinations of subsets for analysis, and the system can nonetheless be able to perform the analysis without repeatedly sorting the data set, parsing data set entries, or otherwise analyzing individual entries in the data set.

The system can efficiently process several different kinds of data sets. One such type of data set is a data set that includes multi-dimensional entries arranged in a row/column format such that each entry occupies a row, and each variable dimension is associated with a column. Any number of individual entries may provide data that relates to a single event—such as an action, outcome, sale, item, time period, or the like. Additionally or alternatively, individual entries may provide data that relates to a grouping of such events. Within an entry, multiple dimensions of data may be used to provide information about a represented event or grouping of events.

For example, in a data set such as the one shown below in Table 1, each row entry can hypothetically represent sales of a specific class of furniture at one store in a chain business. In the aggregate, the data set can hypothetically represent such furniture sales results for all furniture sold by the business at all locations. For purposes of explanation, assume that in this hypothetical arrangement, the "color" and "piece" data found in each row represents a grouping of the various sales of one class of furniture made at a store. Within each entry (i.e., row), the "units" represent the number of such sales events, and the "price" represents the price at which the furniture sold.

TABLE 1

| COLOR | PIECE | UNITS SOLD | UNIT PRICE |
| --- | --- | --- | --- |
| RED | TABLE | 5 | 20 |
| BLUE | CHAIR | 3 | 25 |
| BLUE | STOOL | 1 | 25 |
| BLUE | TABLE | 5 | 20 |
| RED | STOOL | 2 | 30 |
| BLUE | TABLE | 7 | 30 |
| RED | STOOL | 11 | 30 |
| RED | STOOL | 3 | 20 |
| BLUE | STOOL | 6 | 20 |
| BLUE | CHAIR | 8 | 15 |
| RED | CHAIR | 5 | 25 |
| BLUE | TABLE | 2 | 25 |
| BLUE | CHAIR | 4 | 20 |
| RED | TABLE | 5 | 20 |
| RED | STOOL | 3 | 25 |
| BLUE | CHAIR | 6 | 25 |
| RED | CHAIR | 12 | 30 |
| BLUE | TABLE | 9 | 15 |
| RED | TABLE | 5 | 20 |
| BLUE | CHAIR | 8 | 15 |
| RED | STOOL | 1 | 25 |
| RED | TABLE | 5 | 20 |
| RED | STOOL | 2 | 30 |
| RED | TABLE | 7 | 30 |
| RED | STOOL | 11 | 30 |
| RED | STOOL | 3 | 20 |
| BLUE | STOOL | 6 | 20 |
| BLUE | CHAIR | 8 | 15 |
| RED | CHAIR | 5 | 25 |
| BLUE | TABLE | 2 | 25 |
| RED | CHAIR | 4 | 20 |
| RED | TABLE | 5 | 20 |
| RED | STOOL | 3 | 25 |
| BLUE | CHAIR | 6 | 25 |
| RED | CHAIR | 12 | 30 |
| BLUE | TABLE | 9 | 15 |

When processing a multi-dimensional data set such as the one shown above, the system described herein can perform preliminary sorting to identify group-by subsets of the data set. A group-by subset can refer to a group of multi-dimensional entries in which the entries hold the same data with respect to a first variable dimension, as well as the same data with respect to a second variable dimension. For example, Table 2 shows a group-by subset of the data set shown in Table 1.

TABLE 2

| COLOR | PIECE | UNITS SOLD | PRICE |
|---|---|---|---|
| BLUE | STOOL | 1 | 25 |
| BLUE | STOOL | 6 | 20 |
| BLUE | STOOL | 6 | 20 |

The group-by subset in Table 2 is a two-dimensional group-by subset that is "formed on" the "color" and "piece" variables (the two variables with respect to which data is the same in all rows). Any variable on which a group-by subset is formed is referred to as a "group-by variable." Thus, in the case of the group-by subset shown in Table 2, the "color" and "piece" variables are both group-by variables.

Additionally or alternatively, a group-by subset, as used in the system disclosed herein, can be formed on more than two variables. For example, a three-dimensional group-by subset can be formed on the variables "color", "piece" and "price", or "color", "piece", and "units sold." A subset that includes only the bottom two data entries in Table 2 is one example of a group-by subset formed on either such combination of three variables.

The objects that are created to statistically summarize the group-by subsets may be formatted in accordance with a shared data structure scheme in which statistical information can be stored, referenced, edited, and retrieved in the same manner from one object to the next. As described herein, objects may include any statistical or quantitative information related to the group-by subsets that the objects represent.

For example, an object used to represent the group-by subset in Table 2 can include information such as the cardinality of the group-by subset (i.e., the number of entries in the subset), which is three in this case. Also, as additional examples, the same object may include information indicating that eleven pieces of sold furniture are represented by the group-by subset entries, the range of prices at which these pieces sold is twenty to twenty-five dollars, or that the average sales price of the thirteen pieces is $20.40 (i.e., [1*25+6*20+6*20]/[1+6+6]).

Any object used to represent a group-by subset may also include identity information that indicates the group-by subset that the object represents. Such identity information may indicate the group-by variables on which the group-by set is formed, as well as the data corresponding to those group-by variables found in the constituent entries of the group-by set. Thus, an object representing the group-by subset of Table 2 can hold the values "blue" and "stool" or "color.blue" and "piece.stool" in an object memory location or segment reserved for identity information.

The objects or the information the objects hold can be searched, referenced, manipulated, edited, and/or retrieved from memory using standardized queries or operations. The standardized queries or operations can cause the computing system to reference individual objects, ranges of objects, or combinations of objects based on the information stored in the objects. This information includes the identity information, as well as the statistical summary information, or both types of information in combination.

For example, during a statistical analysis of a dataset such as the one shown in Table 1, a user may be interested in analyzing the average price at which chairs were sold or the total number of tables sold throughout the entire chain of stores. For inquiries such as these, the system described herein can facilitate the use of queries or retrieval instructions that trigger the return of data from the particular objects that represent group-by sets formed on the variable "piece", and which contain entries containing the data value "table" or "chair." The system also facilitates the use of instructions for averaging, summing, or performing any other mathematical or statistical operations on the retrieved information.

The description provided thus far is relevant to a computer system operated in isolation in such a way that the data set is stored at one memory location. However, a parallelized grid-computing system may also operate using the techniques described above. When a grid-computing system is used, the data set may be partitioned such that disjoint portions of the data set are to be stored and processed at each computing device in the grid-computing system. This approach facilitates additional speedup of the operations required to sort the data set into group-by subsets, statistically analyze the group-by subsets, generate and store objects, and retrieve information from objects.

Several drawings will now be described to explain certain examples of techniques, designs, operations, and features contemplated by this disclosure. While particular embodiments are described below, this disclosure should be understood as covering the many other alternative embodiments that will be recognizable, or readily derivable, in view of the information provided herein. Where this disclosure provides specific details, examples, implementations, or algorithms related to the subject matter, each such specific description shall be understood as being provided for explanatory purposes only, and as such, indicates only one of the many embodiments to which this disclosure is directed. Thus, no such specific description shall be construed as expressly or impliedly limiting, defining, or delineating the scope of the subject matter presented herein.

FIG. 1 illustrates a computing device 100 configured to use the techniques described in this disclosure to efficiently compute summary statistics for large sets of data. As depicted in FIG. 1, the computing device 100 includes a processor 102, random access memory 104, and memory 106. Memory 106 may be used to store software 108 executed by the processor 102.

The software 108 can be analytical, statistical, scientific, or business analysis software, or any other software with functionality for computing summary statistics or analytic information representative of any amount of data in large data sets. The software 108 includes instructions for performing group-by sorting and data analysis. When executed, the software 108 causes the processor 102 to calculate user-requested summary statistics with regards to data sets 111 or subsets 111S-1, 111S-2, 111S-3 stored in the random access memory (RAM) 104.

The computing device 100 may store data sets 111 in accordance with any data storage format, including a row/column or tuple format. For purposes of simplicity, this disclosure generally describes data stored in a row/column format. However, this particular convention is not intended to limit the scope of this disclosure in any way, nor is it intended to imply that the disclosure is more relevant to the processing of data in row/column format than to data in some other format.

The data sets 111 can include any type of data, including scientific or business data—whether gathered manually, automatically from sensors, or generated by commercial, Internet, mechanical or communications activity. For example, a data set 111 may include information such as the credit card account numbers involved in transactions with a business during a given period of time. A data set 111 may include numbers, strings, symbols, codes, or any other representation having informational value. Within any one data set 111, multiple types of data and multiple data formats may be stored.

The computing device 100 may perform group-by sorting of the constituent entries of data sets 111 that the device stores. During group-by sorting, the computing device 100 may assign individual entries (not depicted) to one or more group-by subsets based on the data values that the entries hold.

Figure 2:
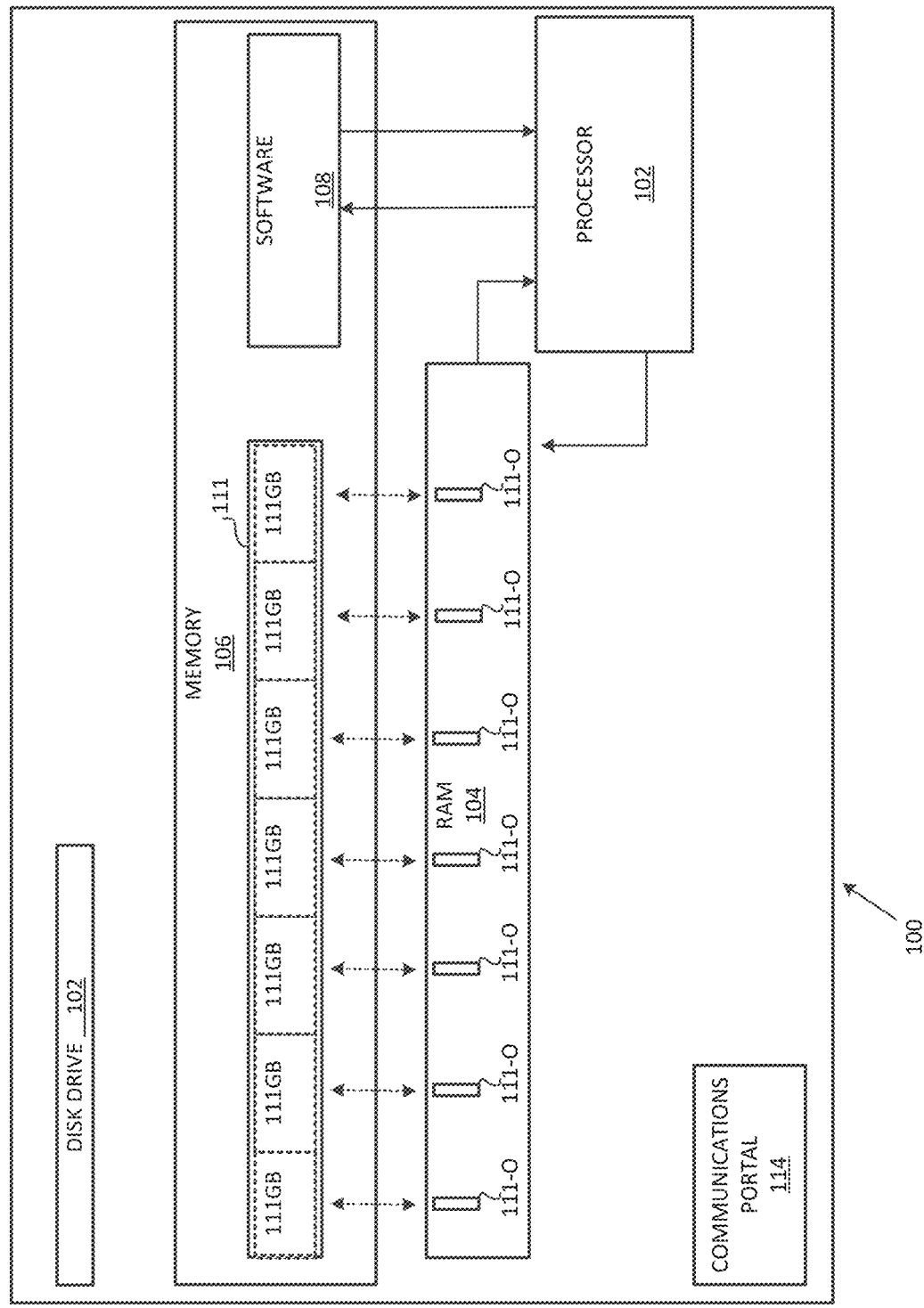
FIG. 2 is a block diagram with an example of a computing device configured to perform operations and use techniques described in this disclosure.

FIG. 2 depicts a data set 111 after the entries of the data set have been assigned to group-by subsets 111GB. Although FIG. 2 shows subsets 111GB which appear to be disjoint, the computing device 100 may sort entries from data set 111 into intersecting subsets, disjoint subsets, or both. For this reason, the reference numeral 111GB will be used to refer to all group-by subsets, without regard to whether or not they intersect any other group-by subset. Through the use of intersecting group-by subsets 111GB, the computing device 100 may statistically analyze and store objects to represent many more group-by subsets 111GB than are available to be analyzed and represented when only disjoint group-by subsets 111GB are handled. Broad representation of numerous group-by subsets 111GB may enable a user of the computing device 100 to be provided with more options for specifying data to be analyzed, retrieved, or inspected.

When the computing device 100 performs group-by sorting that involves intersecting group-by subsets 111GB, it may be appropriate to group individual entries into more than one group-by subset 111GB. For this reason, it may be advisable that the computing device 100 be programmed by the software 108 to include features that protect against double-counting of entries during analysis of any portion of data defined by reference to intersecting group-by subsets 111GB. One simple protective feature is facilitated by reference to a stored list (not depicted) of intersecting group-by subsets 111GB used by the computing device 100. When such a list is stored, the computing device 100 can use the list to restrict a user from referencing intersecting group-by subsets when the user specifies a portion of a data set 111 to be analyzed.

The computing device 100 may perform the group-by sorting using in-place sorting techniques, as implied by FIG. 2. Additionally or alternatively, the computing device 100 may perform sorting by leaving a data set 111 unaltered in memory 106, while creating additional storage structures or abstractions to effectuate the group-by sorting.

FIG. 2 also shows that a computing device 100 represents each group-by subset 111GB by creating an object 111-O that is indexed to the subset and stored in RAM 104. The computing device 100 can index objects 111-O to their respective group-by subsets 111GB using identity information stored in the objects. The indexing provided by the identity information is represented by the arrows in between each object/subset pair.

A data set 111 may include multiple subsets (whether group-by subsets or otherwise), any of which may be defined arbitrarily or according to a definitional scheme. For example, FIG. 1 shows that data set 111 may be conceptualized as the union of subsets 111S-1, 111S-2 and 111S-3.

The depiction of data set 111 as a union of subsets 111S-1, 111S-2, and 111S-3 is provided in order to assist in showing an alternative to the data set 111 storage arrangement shown in FIG. 1. For example, referring ahead to FIG. 3, when multiple computing devices operate in grid-computing mode, the data set 111 may be partitioned into subsets 111S-1, 111S-2, and 111S-3 so that each of these subsets may be stored by a different grid-computing device than the other two subsets.

Figure 3:
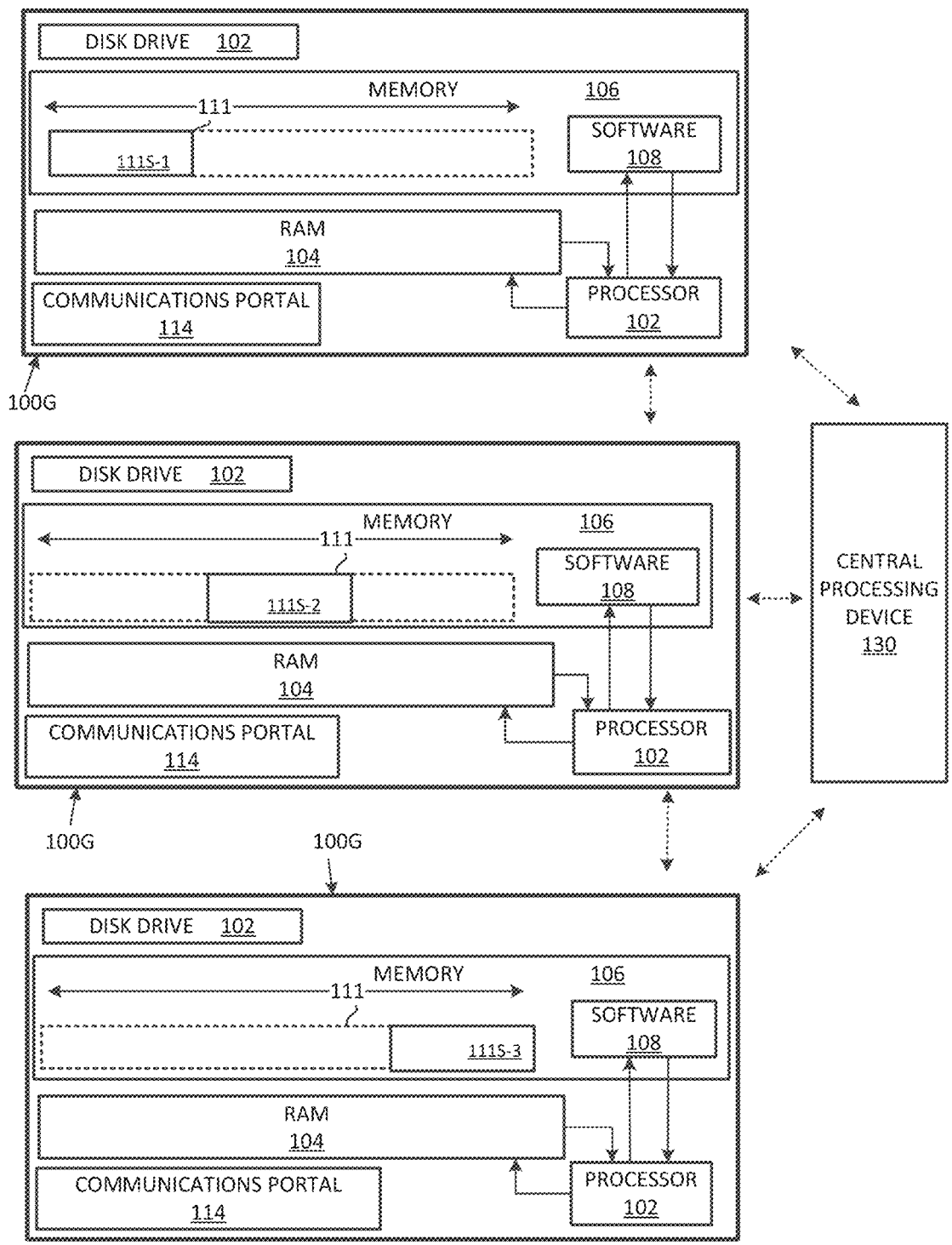
FIG. 3 is a block diagram with an example of three grid-computing devices configured to perform operations and use techniques described in this disclosure.

FIG. 3 depicts the configuration of computing devices in a grid-computing system 120. In the grid-computing mode, multiple computing devices configured as shown in FIG. 1 are operated in a grid-computing system 120 and communicate with a central processing device 130. Operations of the central processing device 130 will be described in more detail later, in an explanation of FIG. 4.

When a computing device is operated in grid-computing mode, it may generally be referred to as a "grid-computing device," and referred to by the reference numeral "100G." Where this disclosure specifies that a computing device is a grid-computing device 100G, the additional specificity should not be understood as implying anything other than a disposition of the device within a grid-computing system and the mode in which the device is operated.

In the grid-computing mode, the processing and data storage entailed by the techniques herein described can be distributed and parallelized as mentioned previously. In this process, portions of a data set 111 are distributed to and stored by individual grid-computing devices 100G. For example, subset 111S-1 can be stored exclusively at one grid-computing device 100G, while subset 111S-2 can be stored at another grid-computing device 100G, and subset 111S-3 at yet another grid-computing device 100G. In FIG. 3, the dashed rectangular lines coinciding with these three subsets 111S-1, 111S-2, 111S-3 are intended to show that each of the subsets results from partitioning the larger data set 111 (explicitly shown in FIG. 1).

The grid-computing devices 100G may process, sort, and statistically analyze their respective subsets 111S-1-111S-3 by employing certain distributed processing techniques that will be described herein in an explanation of FIGS. 9-14. Grid-computing devices 100G may store entire data sets 111, even though the distributed processing techniques available for use in the grid-computing mode may obviate the need for entire data sets 111 to be stored at any one single grid-computing device 100G.

The software 108 may provide certain functionality for use when a computing device is operated in the grid-computing mode. For example, the software 108 may include instructions for using multiple hash functions to calculate hash values. The instructions may provide one or more hash functions for each type of data that the grid-computing devices 100G are configured to store. For example, the software 108 can include a hash function that maps floating point numbers to integer values, and a different hash function that maps strings to integer values.

In grid-computing mode, the application of hash functions to determine hash values can be used to provide control and addressing information that guides both the horizontal communication of statistical information between grid-computing devices 100G and a load sharing arrangement that speeds up the process of generating objects. This use of hash functions will be described in greater detail with reference to FIGS. 11-13.

Hash functions of various different types may be used to provide control and addressing information in the grid-computing mode. However, the software 108 may operate efficiently when hash functions map group-by subset 111GB identity information to integers in all cases. For example, hash function can be easily modifiable based on an operating parameter (n) that represents the number of grid-computing devices 100G in the system. In another example, the hash function can have exactly n equally probable integer hash values (1 . . . n) in its range.

As shown in FIGS. 1, 2, and 3, a computing device 100 (or grid-computing device 100G) includes a disk drive 112 and network communications portal 114. The network communications portal 114 may include a receiver/transmitter assembly (not shown) that enables the computing device 100 to exchange information over a wired or wireless communications network, such as the internet, a local area network (LAN), or wireless local area network (WLAN). When a computing device 100 is operated in grid-computing mode, the device can use the network communications portal 114 to communicate with other grid-computing devices 100G. For example, the network communications portal 114 may be used by a grid-computing device 100G to exchange statistical summary information with other grid-computing devices 100G.

A computing device 100 may update any data set 111 stored in memory 106 by downloading data from the Internet or accessing remote data bases or servers, and storing the data following download. Similarly, the computing device 100 may access new or additional data sets 110 by reading data sets 111 from a medium inserted into the disk drive 112, and storing these data sets in RAM 104. Also, the computing device 100 may supplement existing data sets 110 stored in RAM 104 by reading additional data from a medium in the disk drive 112 and using the data to supplement data sets already stored in RAM 104.

Figure 4:
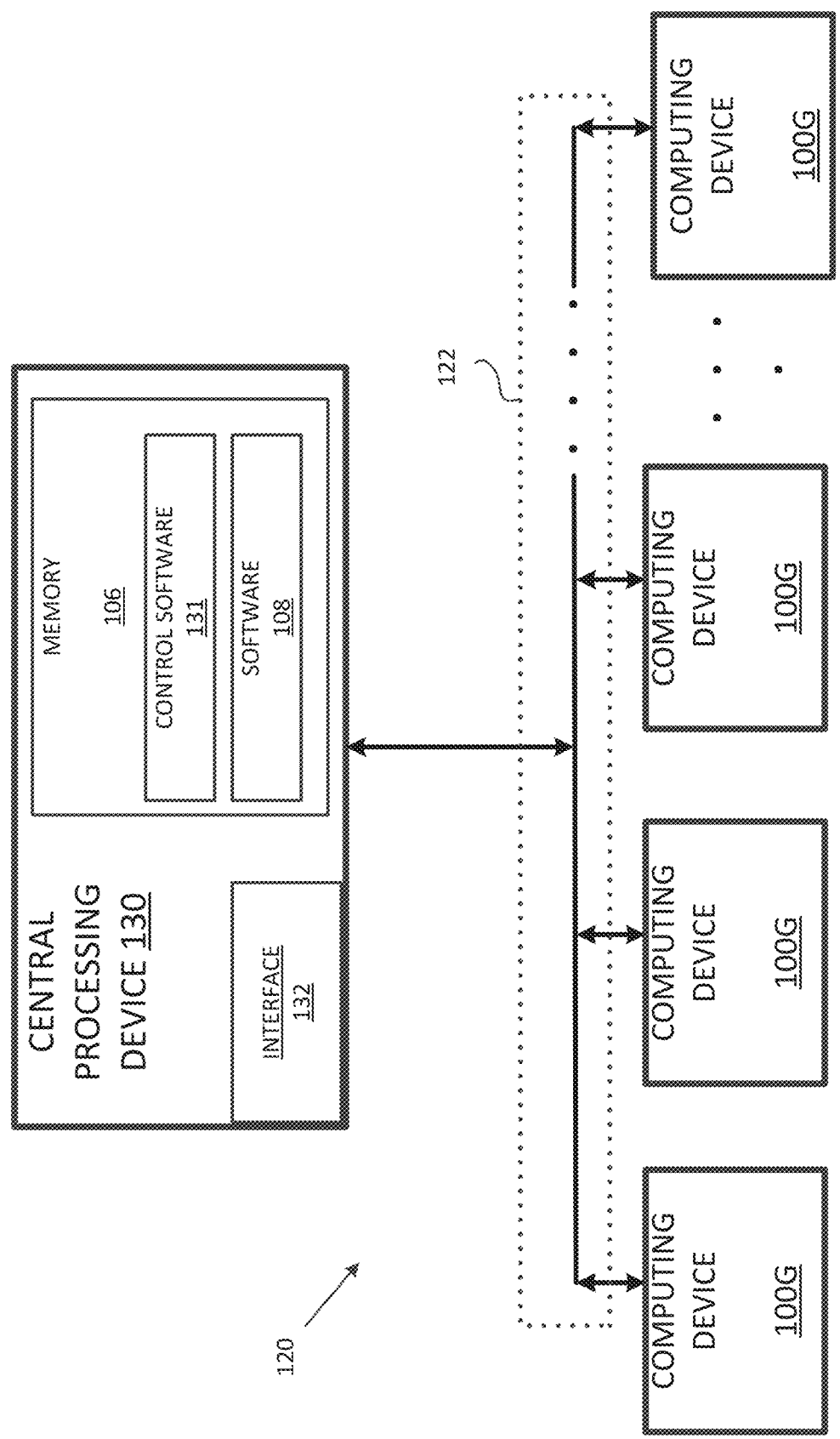
FIG. 4 is a block diagram that depicts an example of a grid-computing system configured to perform operations described in this disclosure.

FIG. 4 depicts an example of a grid-computing system 120 that includes multiple grid-computing devices 100G that are mutually linked, either directly or indirectly, by a data bus 122 (a wired or wireless communications network may be used in place of a data bus). The data bus 122 enables each grid-computing device 100G to share information with any number of other grid-computing devices 100G in the grid-computing system 120.

Grid-computing devices 100G may be uniquely referenced by an identification address, such as an Internet Protocol (IP) number. Moreover, grid-computing devices 100G may store the identification addresses of other grid-computing devices 100G within memory 106. In this way, a grid-computing device 100G may use data bus 122 to selectively transmit or forward data to any other grid-computing device 100G.

In the grid-computing system 120, a central processing device 130 (hereinafter also referred to as a "central controller" for brevity) provides control and timing information that coordinates parallel processing operations performed at grid-computing devices 100G. The central controller 130 can be configured to selectively transmit or broadcast information to any of the grid-computing devices 100G using data bus 122, a wireless network connection, or any other type of suitable medium.

The grid-computing system 120 may be arranged so that the central controller 130 communicates directly with other grid-computing devices 100G in the system 120, or communicates with some of the grid-computing devices 100G by way of any number of relay stages in which one grid-computing device 100G forwards information to another device 100G.

The grid-computing system 120 may be used to calculate a variety of summary statistics with regards to data sets 111, and may apply various combinations of the processing and algorithmic techniques described herein to save memory and speedup the calculation of the statistics. When the grid-computing system 120 is used to calculate statistical information for data sets 111, the central controller 130 can use its communications capabilities to distribute data to the grid-computing devices 100G and query objects 111-O stored at the grid-computing devices 100G.

For example, in one grid-computing system 120 operating mode, the central controller 130 periodically receives inputted commands to perform a statistical analysis of specified categories or group-by subsets 111GB of data within a data set 111. When a command is received, the central controller 130 queries the grid-computing devices 100G for objects 111-O that summarize group-by subsets 111GB relevant to the pending analysis. The grid-computing devices 100G respond to the query by returning objects 111-O that satisfy a retrieval criteria specified by the query, or by returning requested information stored by such objects 111-O.

The central controller 130 may then generate the requested statistical summary by performing additional processing to aggregate or synthesize the statistical information stored by the retrieved objects 111-O.

The central controller 130 includes the various components, software, and interfaces described previously with regards to grid-computing devices 100G. Additionally, the central controller 130 may also include control software 131 that provides instructions related to controlling the operations of the grid-computing system 120. The control software 131 also includes instructions for processing user inputs, formatting object queries, and processing statistical information to generate final statistical summaries of a data set 111.

Additionally, the central controller 130 includes an interface 132 through which users can interact with and configure the grid-computing system 120. For example, the central controller 130 may include or interact with a display screen through which a user may select data sets 111 to be analyzed, specify a type of analysis to be performed on any data set 111 or combination of data sets (e.g., clustering, sorting, grouping, averaging, and distinct count), and input analysis parameters, data display requirements, or other specifications.

Figure 5:
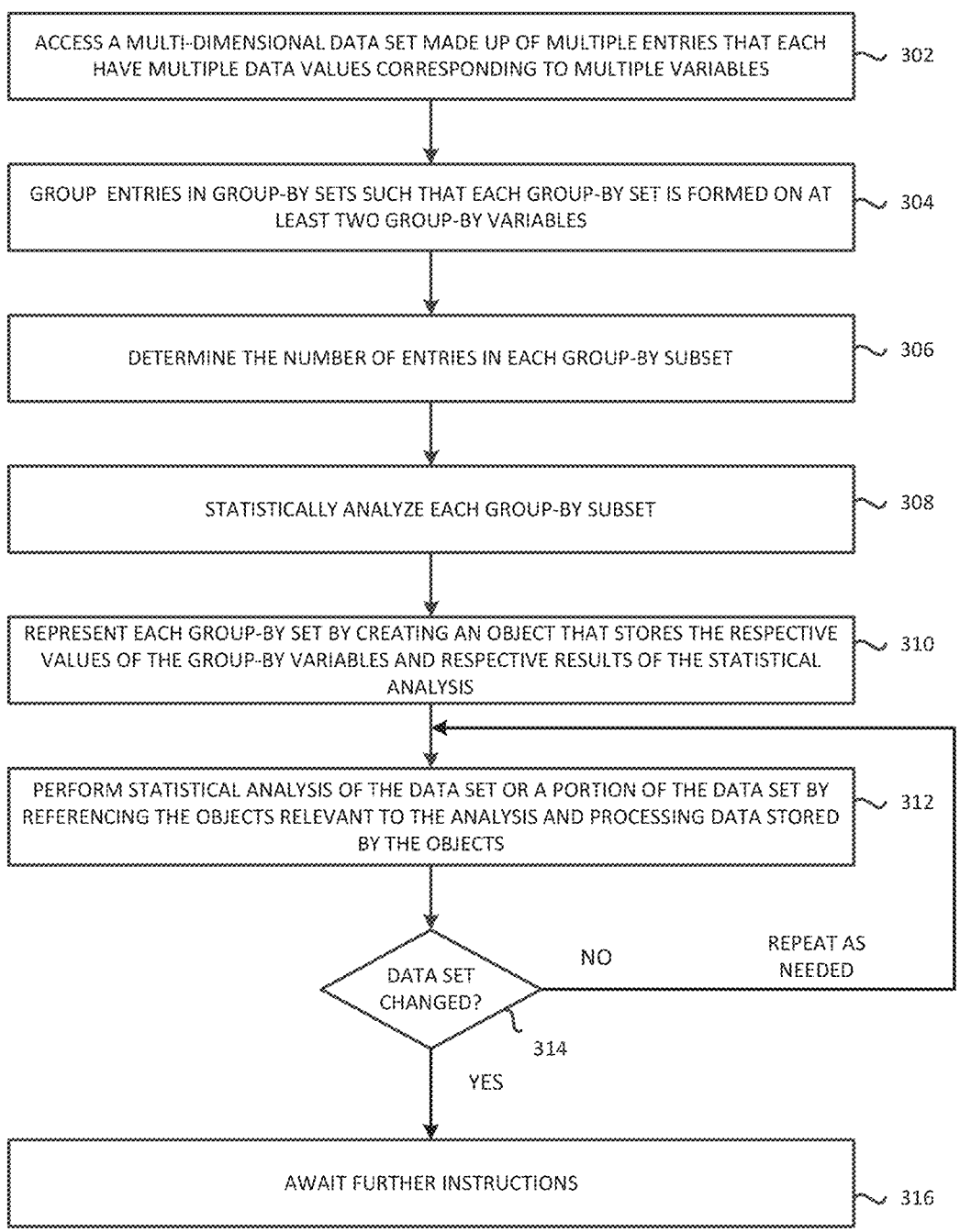
FIG. 5 is a flow chart that depicts one example of procedures described herein for using a computing device to calculate summary statistics.

FIG. 5 is a flow diagram that illustrates certain processing techniques described herein. The flow diagram is directed to a single computing device 100 that stores a complete data set in memory and performs repeated statistical analysis of the data set in response to inputted commands. The operations illustrated in FIG. 5 begin at 302. At 302, the computing device 100 accesses a multi-dimensional data set made up of multiple entries that have multiple data values that correspond to multiple variables. At 304, the computing device 100 groups entries in group-by sets such that each group-by set is formed on at least two group-by variables.

At 306, the computing device 100 computes the cardinality of each of the group-by subsets by determining the number of entries in the subset. At 308, the computing device 100 performs analysis of each group-by subset. At 310, the computing device 100 represents each group-by subset by creating an object that stores the respective values of the group-by variables and the results of the statistical analysis of the subset. At 312, the computing device 100 performs statistical analysis of the data set by referencing some or all of the objects stored during the operations depicted at 310.

At 314, the computing device 100 determines whether the data set has been changed. If the data set has not been changed, the computing device 100 repeats operations 312-314 as needed. For example, the computing device 100 may repeatedly analyze the data set as shown at 312, and may perform any of these analyses in any number of ways.

If, at 314, the computing device 100 determines that the data set has been changed, then the computing device awaits further instructions, as shown at 316.

Figure 6:
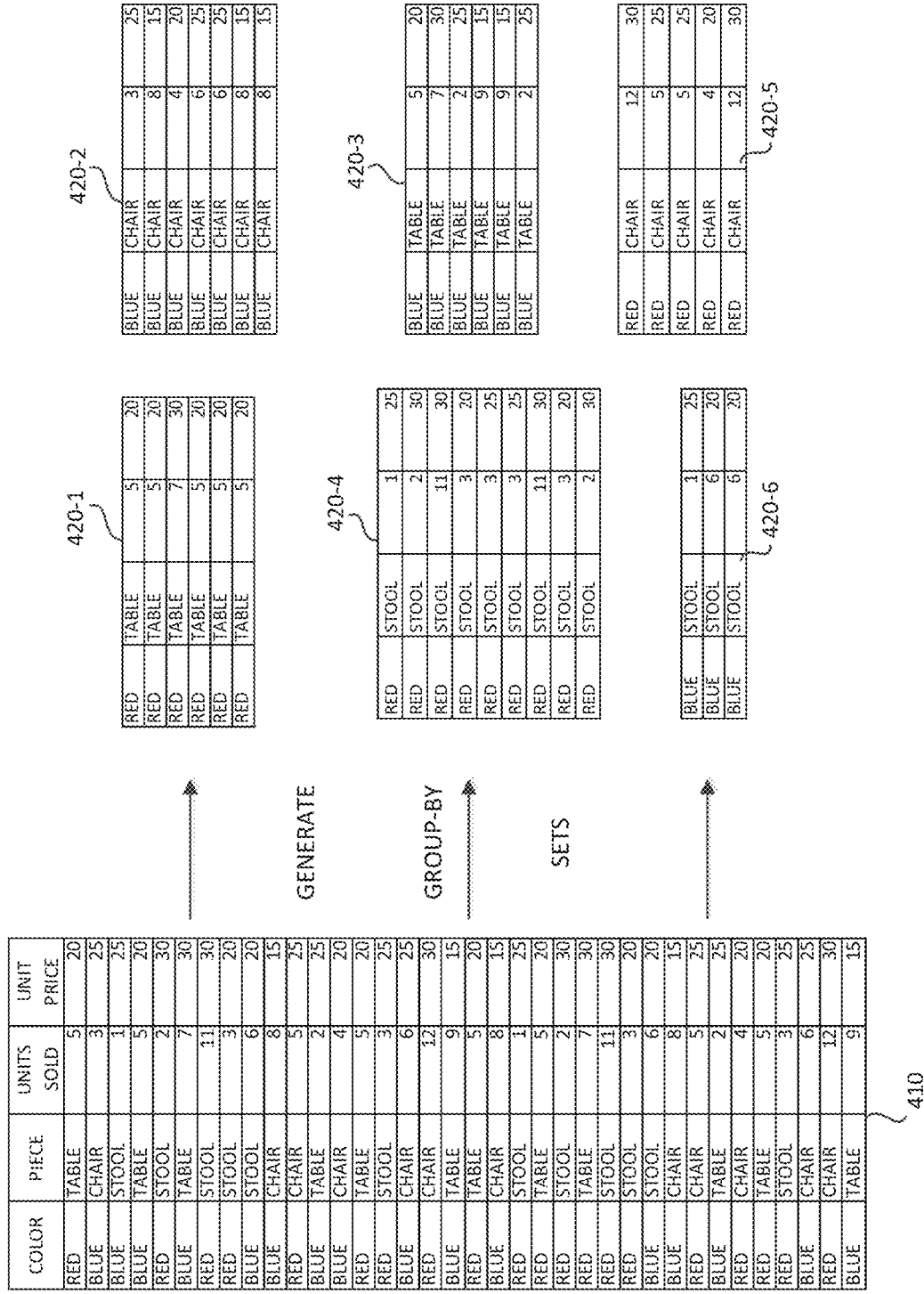
FIGS. 6-8 depict an example of a sequence of operations and procedures in which certain of the techniques disclosed herein are applied during three different statistical analyses of subsets of a data set.
Figure 7:
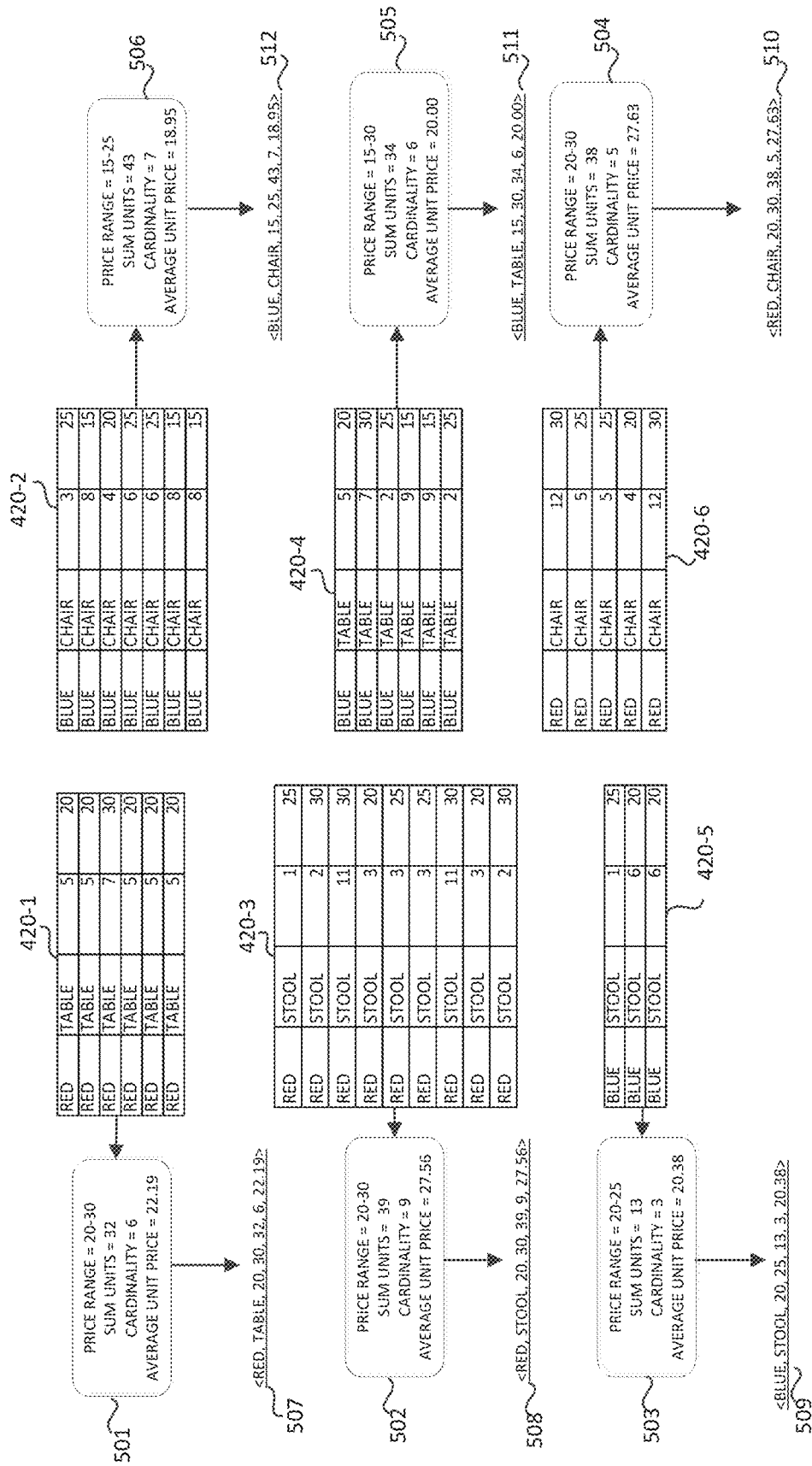
Figure 8:
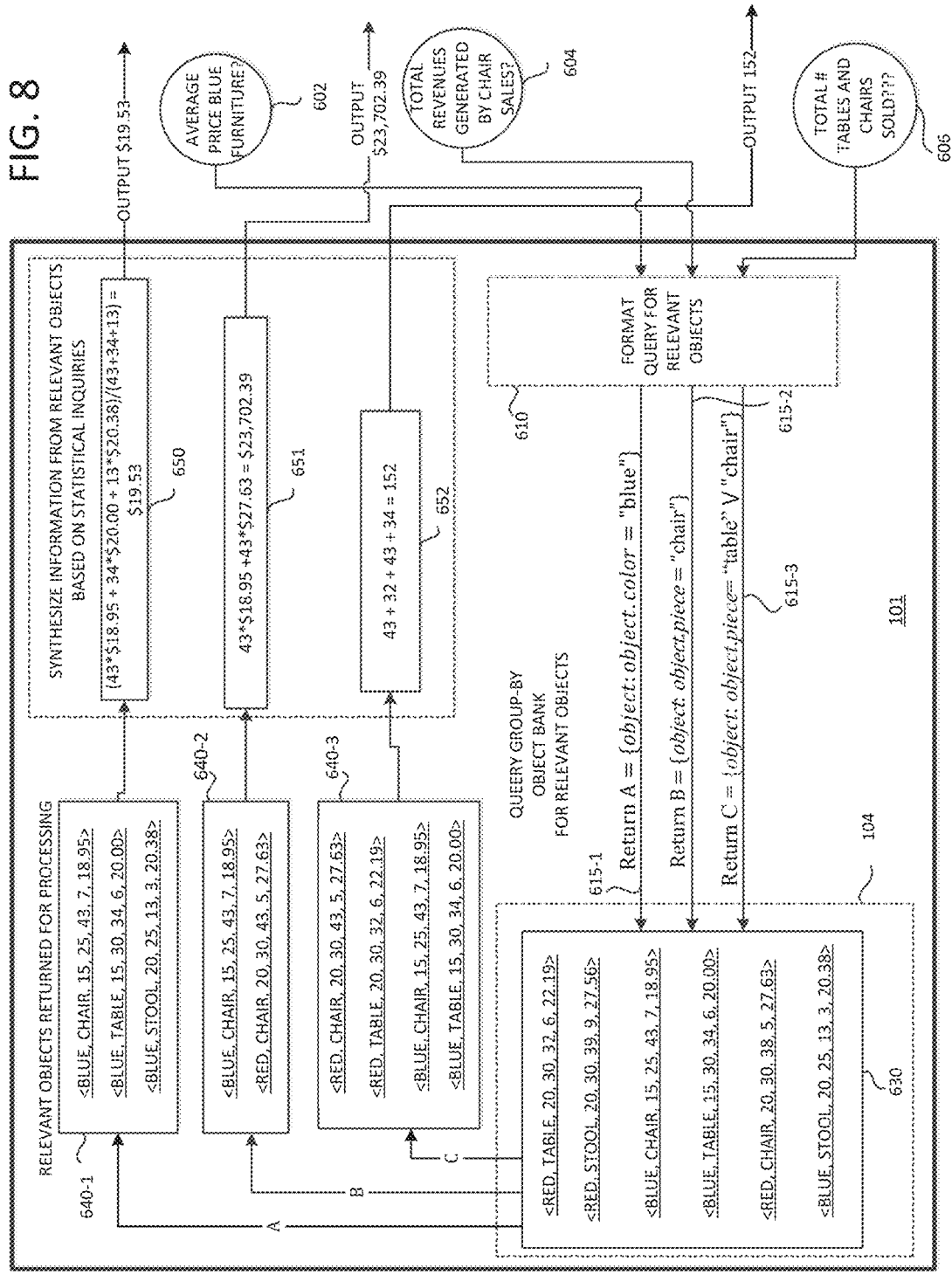

FIGS. 6-8 illustrate one example of operations, steps and results obtained when a computing device 100 employs one version of the techniques of FIG. 5 to statistically analyze a particular data set. The data set that is statistically analyzed is shown at 410, and is identical to the data set that was shown previously in Table 1. For the purposes of FIGS. 6-8, the following description will assume the hypothetical scenario described in the discussion of Table 1. In that scenario, each row of data set 410 is an entry that provides sales information about a particular variety of furniture sold at a given store in a chain establishment. Sales information for all of the stores in the establishment is found in the data set 410, such that the data set 410 documents, in the aggregate, all sales of furniture made by the establishment.

The data set 410 may be initially stored in memory 106 at computing device 100. The computing device 100 may then execute group-by sorting during which rows of the data set 410 are assigned to group-by subsets formed on the "color" and "piece" variables of the data set 410. Six group-by subsets that result from such sorting are shown at 420, and the computing device 100 may store these group-by subsets in memory 106.

Reference numerals 420-1, 420-2, . . . 420-6 are used in FIG. 6 so as to facilitate differentiating between the group-by subsets, and are used herein to refer to specific group-by subsets. However, the reference numeral 420 is used to refer to the six group-by subsets generally or in the aggregate.

Although the group-by sorting depicted in FIG. 6 involves one combination of group-by variables, group-by subsets can be formed on various distinct combinations of group-by variables, and this disclosure is fully intended to cover such broader use of group-by sorting. A computing device may identify additional group-by subsets by increasing the number of combinations of group-by variables used in group-by sorting. As described previously, any number of individual rows of a data set may be assigned to multiple group-by sets when multiple combinations of group-by variables are used in group-by sorting.

The use of group-by sorting on multiple distinct combinations of group-by variables may enable improved user capabilities and precision in interfacing with and statistically analyzing a data set, as compared to the case when group-by sorting is performed using only one combination of group-by variables. For example, such expanded group-by sorting may be used to provide flexibility in focusing statistical analysis on specific categories of data within a data set. Although the operations shown in FIGS. 7-8 will be explained with regards to group-by subsets 420-1 through 420-6 only, these operations are easily adapted to scenarios in which group-by subsets are formed on various combinations of group-by variables, and this disclosure is expressly directed to any such application, without regard to the extent of group-by sorting.

Figure 15:
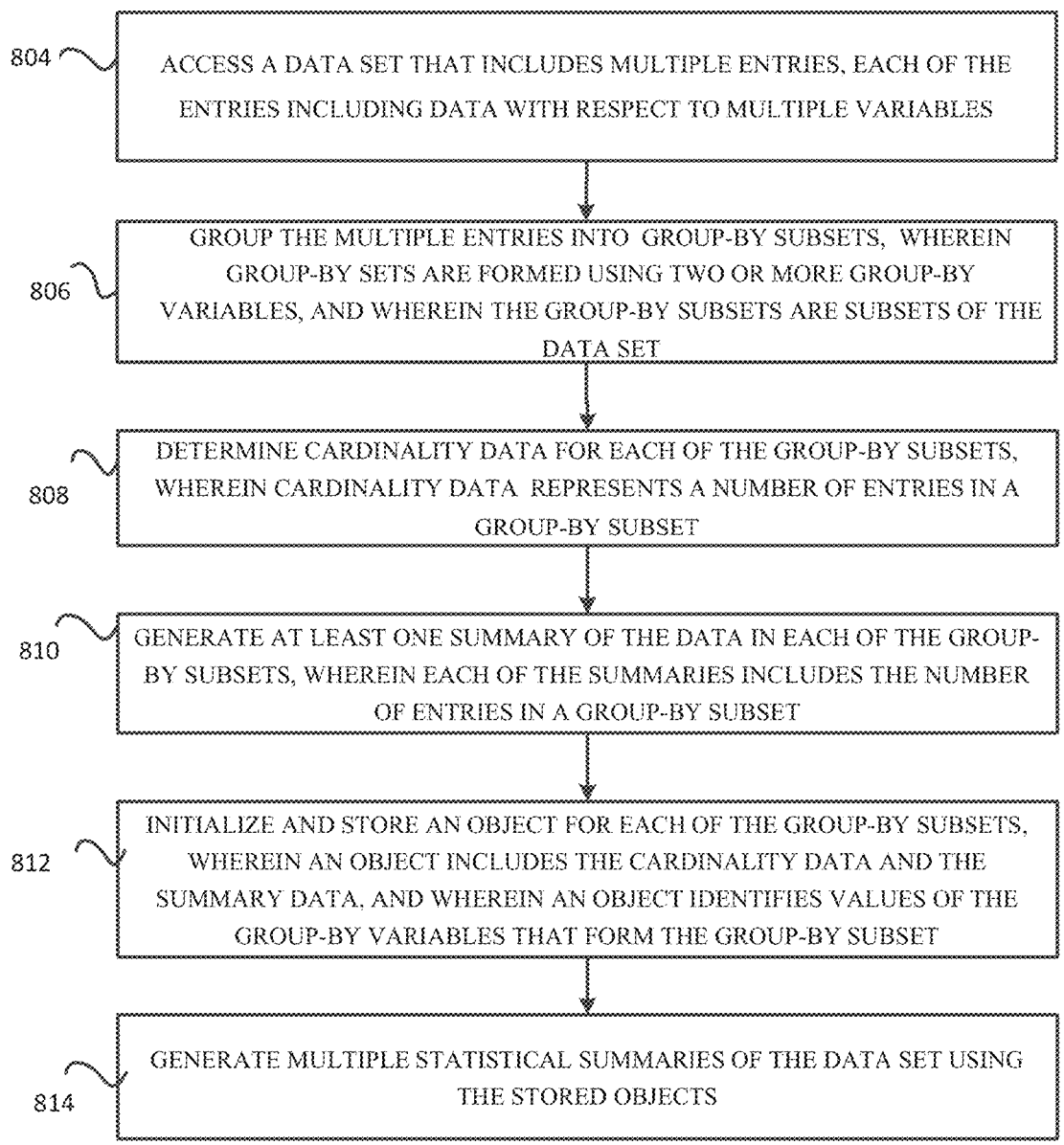
FIG. 15 is a flow diagram depicting an example of a sequence of operations for performing statistical analysis of a data set.

After group-by subsets 420 are determined and stored as shown in FIG. 15, the computing device 100 performs statistical analysis of each group-by subset 420-1, 420-2, . . . , 420-6. FIG. 7 shows one manner in which the computing device may statistically analyze the group-by subsets. For example, as implied by the arrow connecting group-by subset 420-1 and the statistical summary shown at 501, the computing device 100 summarizes the data entries of group-by subset 420-1 by calculating four summary statistics. These summary statistics include a price range, a number of units sold, a subset cardinality (e.g., number of constituent rows or entries), and an average sales price with regard to the data entries of group-by subset 420-1. This resulting statistical data is shown at 501.

As further shown in FIG. 7, the computing device 100 performs the aforementioned statistical analysis with respect to each of the group-by subsets 420-1, 420-2, . . . . , 420-6. The resulting statistical summaries of the group-by subsets 420 are shown at 501-506, such that each statistical summary 501-506 is graphically connected by an arrow with the group-by subset to which the summary corresponds. Although not depicted in FIG. 7, the computing device 100 stores the statistical summaries 501-506 in memory 106 so that it can subsequently be used in the creation of objects that represent the group-by subsets 420.

The computing device 100 then processes each group-by subset statistical summary 501-506 to create objects 507-512 that represent the group-by subsets 420. Objects 507-512 are represented as 7-tuples in FIG. 7. However, objects may be structured in accordance with any format that facilitates the storage of statistical information, as well as identity information that indicates correspondence between individual objects and the group-by subsets that they represent. Regardless of the object formatting employed, for reasons of simplicity and efficiency, objects can be structured according to a common format that enables the information stored in the objects to be referenced or retrieved in a same manner from one object to the next.

Each of the objects 507-512 is depicted as storing identity information that identifies the group-by set represented by the object. Identity information is shown being stored as the first two elements of each of the objects 507-512. For example, object 511 represents group-by subset 420-4, which itself includes all data set 410 entries related to the sale of blue tables. For this reason, the identity data of object 511 includes the value "blue" as the first object element, and the value "table" as the second object element. Also, the third through seventh elements of object 511 are used to store the information provided by the statistical summary 505. For example, the eighth element of object 511 holds the average sale price of the units represented within group-by subset 420-4. Additionally, FIG. 7 shows that objects 507-510 and 512 store identity information and statistical information in accordance with the same format as object 511.

FIG. 8 illustrates one example of operations involving the use of objects by computing device 100 during statistical analysis of data set 410. After the computing device 100 creates objects 507-512, the objects may be stored in a dedicated portion of RAM 104. In FIG. 8, the storage of objects 507-512 in RAM 104 is depicted at 630.

FIG. 8 shows statistical inquiry instructions 602, 604, 606 being inputted to the computing device 100 by a user interested in analyzing certain subsets of data set 410. At 610, the computing device 100 processes these instructions 602, 604, 606 and formats queries for objects relevant to each statistical inquiry.

For example, the user inputs the statistical inquiry instructions shown at 602 to determine the average price associated with blue furniture sales represented within the data set 410. In processing these particular instructions, the computing device 100 processor 102 (not shown in FIG. 8) formats query 615-1 in order to retrieve all objects that hold "blue" in the identity information element corresponding to the "color" variable (the first element). The objects that meet this criteria are retrieved from memory, as shown at 640-1.

The computing device 100 then process statistical information stored by the objects shown at 640-1 to determine the average price of the various blue furniture sales represented in data set 410. For example, a number of items sold and the average price of these items is extracted from each of the objects shown at 640-1. This data is then used to compute the average price of blue furniture sold by the chain, as shown at 650. The computing device calculates that the average price was $19.53, and this value is outputted to the user.

Similarly, a user inputs instructions at 604 in order to determine total revenues generated by the sales of chairs made by the chain. In response, the computing device 100 processor 102 formats query 615-2 in order to retrieve all objects that contain the word "chair" in the identity information element that corresponds to the "piece" variable (the second element). The objects that meet this criteria are retrieved from RAM 104, as shown at 640-2.

The computing device 100 then processes statistical information stored by the objects shown at 640-2 to determine the total revenues generated by chair sales across the entire business. Statistical summary data representing quantify of sold items and average sales price data is read from each of the objects shown at 640-2. This data is then used to compute the total revenues generated by the business's chair sales, as shown at 651. The revenues are calculated to be $23,702.39, and this value is outputted to the user.

A user wishing to determine the total numbers of chairs sold inputs the instructions at 606. In response, the processor 102 formats query 615-3 in order to retrieve all objects that contain the word "table" or "chair" in the identity information element corresponding to the "piece" variable. The objects that meet this criteria are retrieved from RAM 104, as shown at 640-3.

The computing device 100 then processes statistical information held by the objects shown at 640-3 to determine the total quantity of chairs and tables sold by the entire business. Sales number data is extracted from each of the objects shown at 640-2. This data is then used to compute the total number of tables and chairs sold, as shown at 652. The total number is calculated to be 152, and this value is outputted to the user.

FIGS. 9-14 illustrate examples of multiple stages of processing operations when a grid-computing system prepares a particular data set for analysis by performing group-by sorting, statistically analyzing group-by subsets, and forming objects that represent the group-by subsets. FIGS. 9-14 do not depict operations in which the grid-computing system uses the objects in performing statistical analysis. These procedures may be understood by analyzing FIGS. 7-8, in conjunction with FIGS. 9-14. Moreover, the procedures will also be discussed generally without explicit reference to drawings.

FIGS. 9-14 are premised on three grid-computing devices being used within the grid-computing system. The three grid-computing devices communicate with, and execute instructions received from a central controller. In FIGS. 9-14, the data set being prepared for subsequent statistical analysis is the data set 410, which was previously shown in FIG. 6. For the purposes of FIGS. 9-14, the following description will assume the hypothetical scenario described in the discussion of Table I and FIGS. 6-8. In that scenario, each data set 410 row is an entry that provides sales data about a particular variety of furniture sold at a given store in a chain establishment. Sales data for the various stores in the establishment are found in the data set 410, and the data set 410 documents, in the aggregate, all sales of furniture made by the establishment.

In contrast to the situation diagrammed in FIG. 6, FIG. 9 depicts the data set 410 divided into three partitions 610-1, 610-2, 610-3. Each of these three partitions 610-1, 610-2, 610-3 is stored at a different one of the three grid-computing devices.

FIG. 9 further depicts that the three grid computing devices perform group-by sorting of their respective partitions 610-1, 610-2, 610-3. The group-by sorting by the first grid-computing device results in group-by subsets 620-1, 620-2, . . . 620-6. The group-by sorting by the second grid-computing device results in group-by subsets 620-7, 620-8, . . . 620-11. The group-by sorting by the third grid-computing device results in group-by subsets 620-12, 620-11, . . . 620-17.

Because the data set 410 was partitioned and distributed prior to the group-by sorting shown in FIG. 9, several of the resulting group-by subsets 620-1, 620-2, . . . , 620-17 are actually constituent parts of a larger group-by subset that is identifiable when the entire data set 410 is considered. For example, group-by subsets 620-1, 620-7, and 620-14 are actually partitions of a same single group-by subset containing row entries that document sales of red tables.

For this reason, each of the grid-computing devices statistically summarizes each of the smaller subsets (hereinafter referred to as "constituent subsets") that it identifies through group-by sorting of the locally stored entries, and then shares some of the statistical summaries with the other two grid-computing devices. Such sharing between grid-computing devices is referred to hereinafter as "horizontal sharing." In this way, statistical information about constituent subsets of a larger group-by subset (hereinafter referred to as an "aggregate group-by subset") can be synthesized by one of the grid-computing devices so as to generate a statistical summary of the aggregate group-by subset.

The process of horizontal sharing and statistical synthesis may itself be distributed such that no single grid-computing device synthesizes statistical summaries of all aggregate group-by subsets. Rather, a load sharing scheme can be used to avoid bottlenecks in horizontal sharing of statistical information, and to parallelize the process of statistically summarizing aggregate group-by subsets. As part of the load sharing scheme, certain grid-computing devices may be assigned to synthesize statistical summaries of a limited number of the aggregate group-by subsets within a data set. Horizontal sharing of statistical summaries of the constituent subsets 620-1, 620-2, . . . , 620-17 and the load sharing involved in synthesizing statistical summaries of aggregate group-by subsets will be shown with regards to FIG. 12.

Figure 10:
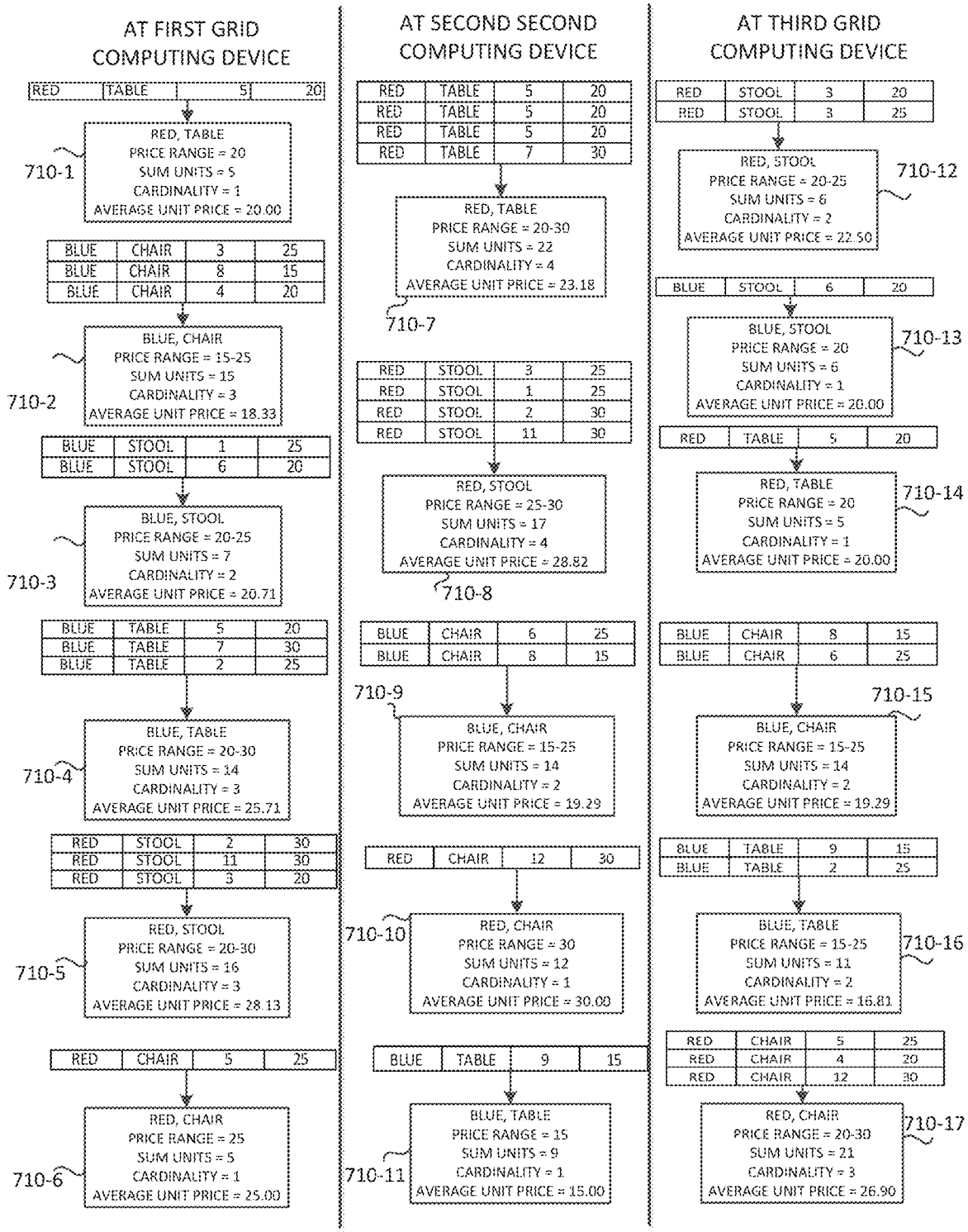

Prior to horizontal sharing, the three grid-computing devices statistically summarize their respective constituent subsets 620-1, 620-2, . . . , 620-17. The process of statistically summarizing constituent subsets is depicted in FIG. 10 and may be generally similar to the process of summarizing group-by subsets that was previously explained in the discussion of FIG. 7. The process of summarizing the constituent subsets 620-1, 620-2, . . . , 620-17 results in several statistical summaries.

For example, statistical summaries 710-1, 710-2, . . . , 710-6 are generated by the first grid-computing device. Statistical summaries 710-7, 710-8, . . . , 710-11 are generated by the second grid-computing device, and summaries 710-12, 710-13, . . . , 710-17 are generated by the third grid-computing device.

Figure 11:
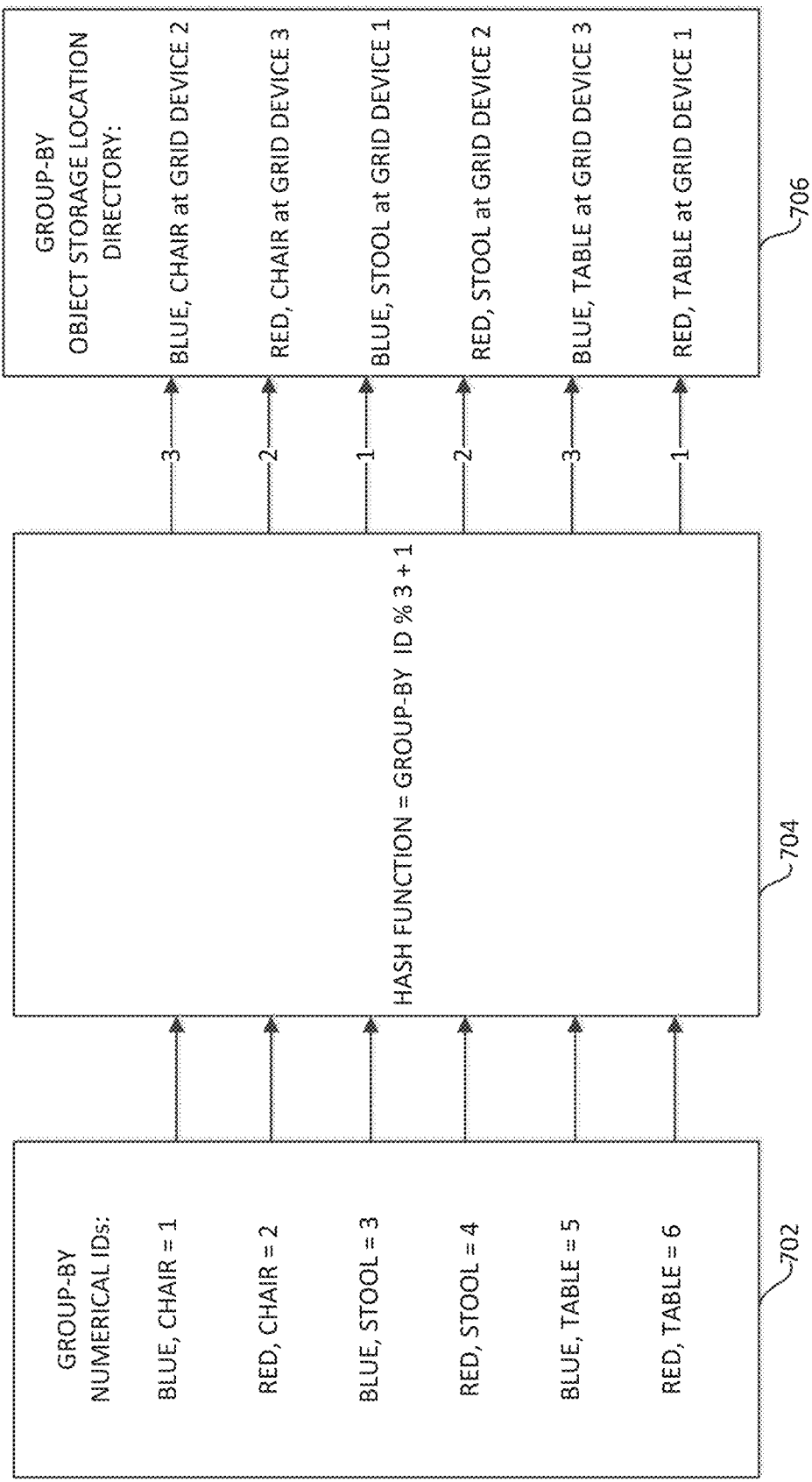

After the statistical summaries 710-2, 710-3, . . . , 710-17 of constituent subsets 620-1, 620-2, . . . , 620-17 are generated, the grid-computing devices use horizontal sharing to generate statistical summaries representative of the aggregate group-by subsets. FIG. 11 depicts a hash function 704 that the grid-computing devices use to determine addresses used in the horizontal sharing of statistical summaries 710-1, 710-2, . . . , 710-17.

The hash function 704, as shown by example in FIG. 11, is premised on a bijective numerical mapping of "piece", "color" data value combinations to representative integers. A list of these representative integers can be seen at 702. Within a grid-computing system, any such list of numerical identifiers can be created for a data set by assigning each possible combination of group-by variable values to a unique integer, such that the various integers form a sequence of consecutive integers.

Based on the mapping shown at 702, the statistical summary information shown at 710-4 maps to 5, since this summary information pertains to a constituent subset in which all entries represent sales activity involving blue tables. Similarly, the statistical summary information shown at 710-10 can be mapped to 2, since this summary information pertains to a constituent subset in which all entries represent sales activity involving red chairs.

The grid-computing devices hash the representative integers determined by the mapping at 702. The hashing of the representative integers generates addresses for the sharing of statistical summaries 710-1, 710-2, . . . , 710-17. The first, second, and third grid computing devices determine the hash values by applying the hash function 704 to the representative integers of the statistical summaries 710-1, 710-2, . . . , 710-17. The hash function 704 includes a modulo-three operation such that hashing the various representative integers 702 will result in an approximately even distribution of hash values across the hash range (i.e., {1, 2, 3} in the case of the hash function depicted at 704).

The hash values that result from the application of hash function 704 are shown at 706. These results serve as an addressing scheme that the first, second, and third grid-computing devices use to determine where each statistical summary 710-1, 710-2, . . . , 710-17 should be sent during horizontal sharing.

For example, the first grid-computing device determines that statistical summary 710-6 should be shared with the third grid-computing device. Similarly, the second grid-computing device determines that statistical summary 710-10 should also be shared with the third grid-computing device. The third grid-computing device determines that statistical summary 710-17 should be retained to be synthesized, along with summaries 710-6 and 710-10, which also include information about constituent subsets related to sales of red chairs.

The basis for these various addressing determinations is that statistical summaries 710-6, 710-10, and 710-17 pertain to constituent subsets that include rows having the values "red" and "chair." The combination of the values "red", and "chair" is represented by the integer 2 at 702. When the hash function 704 is applied to that representative integer, the resulting hash value is 3. Thus, the hashing scheme of FIG. 11 effectively addresses statistical summaries 710-6, 710-10 for communication to the third grid-computing device, and addresses statistical summary 710-17 (which is already stored at the third grid-computing device) to be maintained there so that it may be synthesized together with summaries 710-6 and 710-10.

Figure 12:
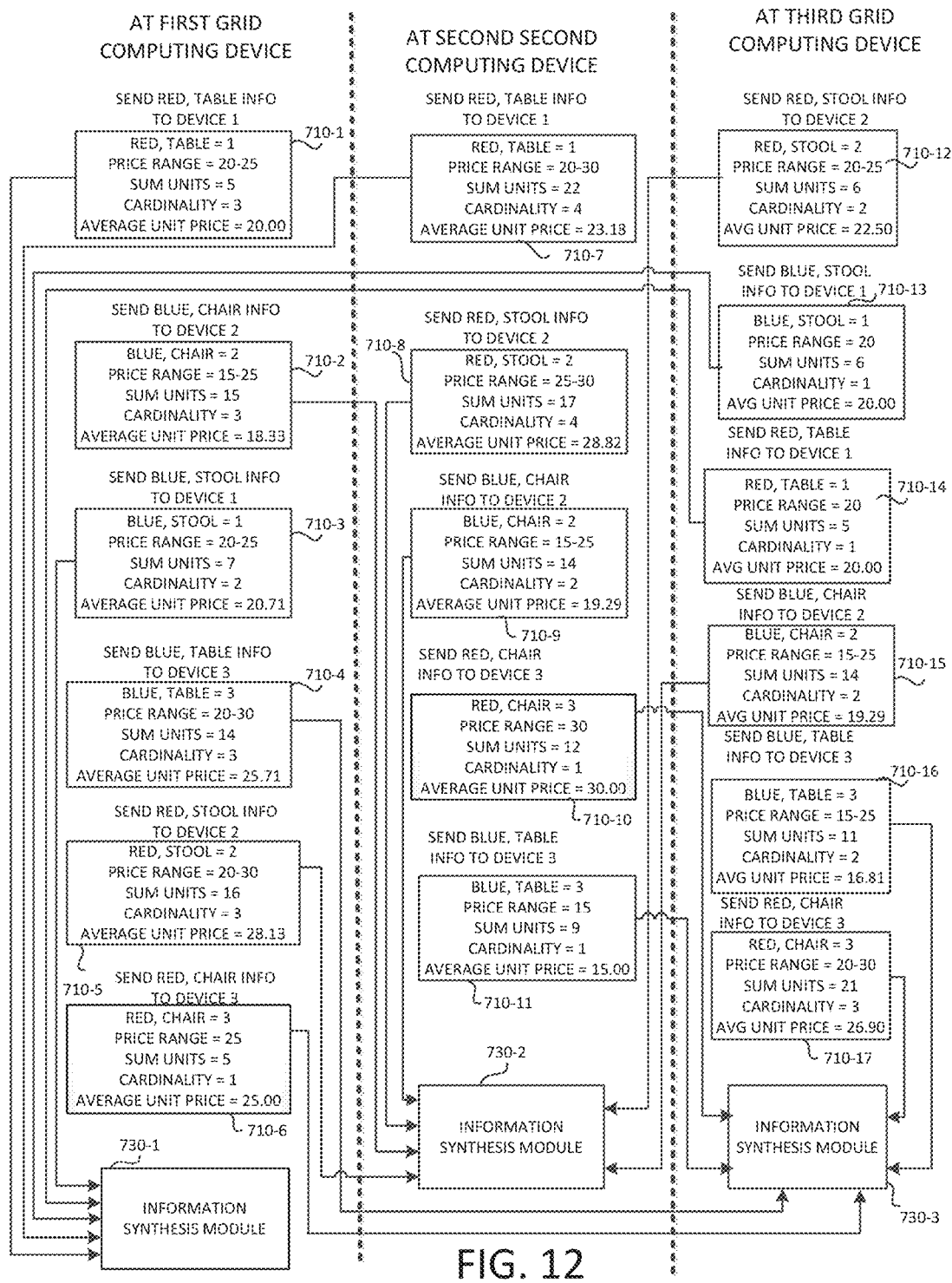

FIG. 12 depicts the horizontal sharing of statistical summaries 710-1, 710-2, . . . , 710-17. In contrast to FIG. 10, FIG. 12 shows each statistical summary 710-1, 710-2, . . . , 710-17 now including a corresponding hash value so as to reflect the hashing described in the explanation of FIG. 11. In each of the statistical summaries 710-1, 710-2, . . . , 710-17, the hash value is depicted at the top line of the summary.

As depicted in FIG. 12, the first, second, and third grid-computing devices horizontally share the statistical summaries 710-1, 710-2, . . . , 710-17 in accordance with the addressing scheme shown in FIG. 11. FIG. 12 also shows that, as a result of the addressing scheme, all statistical summaries of constituent subsets that pertain to a same furniture item are horizontally shared with a same grid-computing device, even though the summaries are generated at different grid-computing devices.

The various statistical summaries addressed to the first grid-computing device (i.e. the summaries shown at 710-1, 710-2, 710-3, 710-7, 710-13, 710-14) are synthesized by an information synthesis module 730-1 executed by the first grid-computing device processor. Similarly, the various statistical summaries addressed to the second grid-computing device (i.e. the summaries shown at 710-5, 710-8, 710-9, 710-12, 710-15) are synthesized by an information synthesis module 730-2 executed by the second grid-computing device processor, and the summaries addressed to the third grid-computing device (i.e. the summaries shown at 710-4, 710-6, 710-10, 710-11, 710-16, and 710-17) are synthesized by an information synthesis module 730-3 executed by the third grid-computing device processor (the processors are not depicted).

Figure 13:
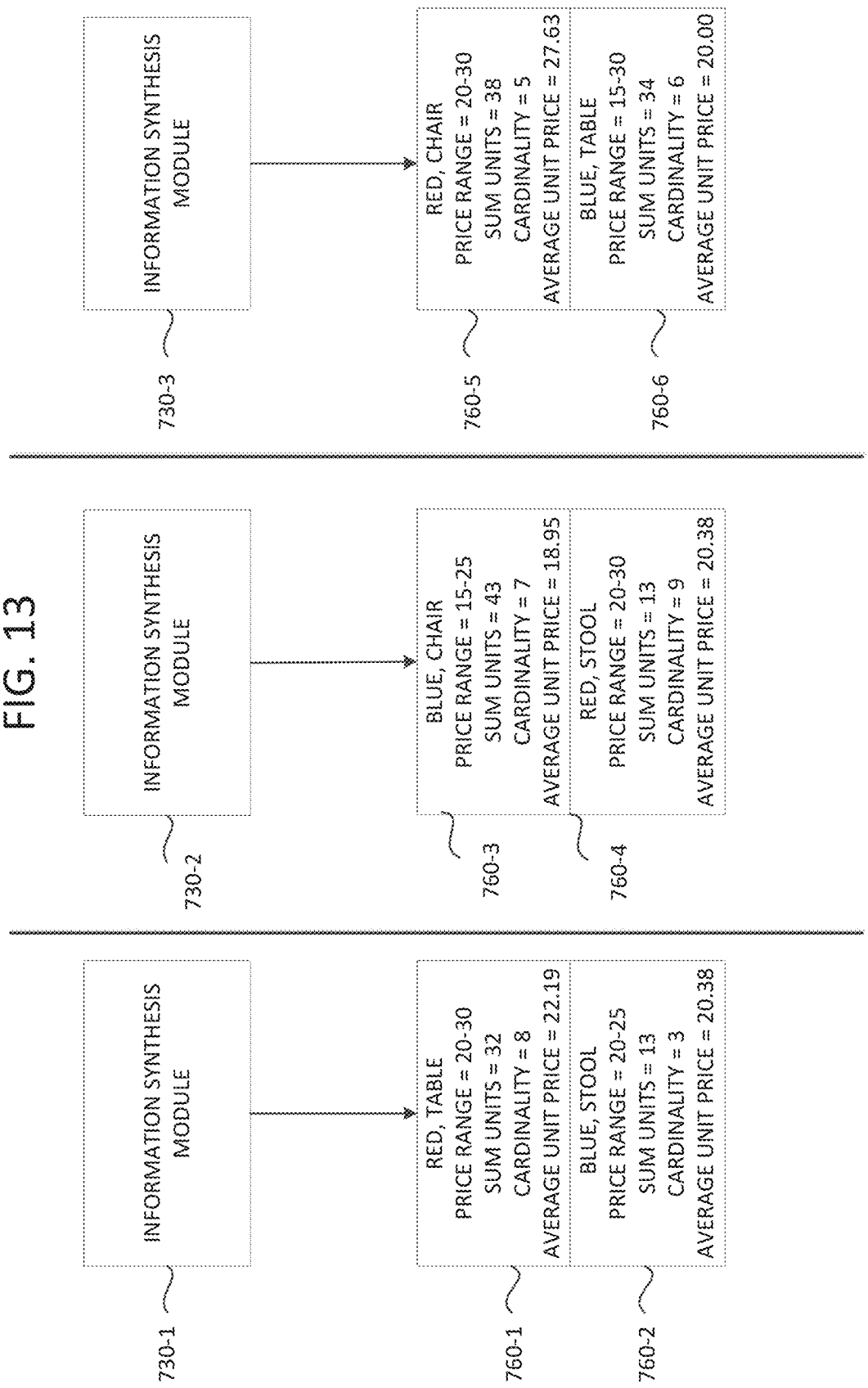

FIG. 13 shows the results obtained when information synthesis modules 730-1, 730-2, and 730-3 synthesize statistical summaries addressed to the first, second and third grid-computing devices, respectively. The information synthesis module 730-1 is executed by the first grid-computing device and synthesizes statistical summaries 710-1, 710-7, and 710-14 (see FIG. 12), each of which pertains to a constituent subset containing rows representing sales of red tables. As such, the union of these subsets is an aggregate group-by subset that includes all the rows of data set 410 that represent sales of red tables.

In synthesizing statistical summaries 710-1, 710-7, and 710-14, the information synthesis module 730-1 processes the statistical summary information as necessary to generate a composite statistical summary 760-1. Composite statistical summary 760-1 summarizes the aggregate group-by set that is the union of the constituent subsets represented by statistical summaries 710-1, 710-7, and 710-14.

The information synthesis module 730-1 also synthesizes statistical summaries 710-3 and 710-13. By synthesizing these two summaries, the information synthesis module generates a composite statistical summary 760-2. Composite statistical summary 760-2 summarizes the aggregate group-by set that is the union of the constituent subsets represented by statistical summaries 710-3 and 710-13.

FIG. 13 also shows results of synthesis of statistical summaries at the second grid-computing device. Here, the synthesis is performed by the information synthesis module 730-2. Information synthesis module 730-2 synthesizes statistical summaries 710-2, 710-9, and 710-15 (see FIG. 12) to generate a composite statistical summary 760-3 of the aggregate group-by subset that includes all the rows of data set 410 that represent sales of blue chairs. Information synthesis module 730-2 also synthesizes statistical summaries 710-5, 710-8, and 710-12 to generate a composite statistical summary 760-3 of the aggregate group-by subset that includes all the rows of data set 410 that represent sales of red stools.

At the third grid-computing device, the synthesis of statistical summaries is performed by the information synthesis module 730-3. Information synthesis module 730-3 synthesizes statistical summaries 710-4, 710-11, and 710-16 to generate a composite statistical summary 760-5 of the aggregate group-by subset that includes all the rows of data set 410 that represent sales of blue tables. Information synthesis module 730-2 also synthesizes statistical summaries 710-6, 710-10, and 710-17 to generate a composite statistical summary 760-6 of the aggregate group-by subset that includes all the rows of data set 410 that represent sales of red chairs.

Figure 14:
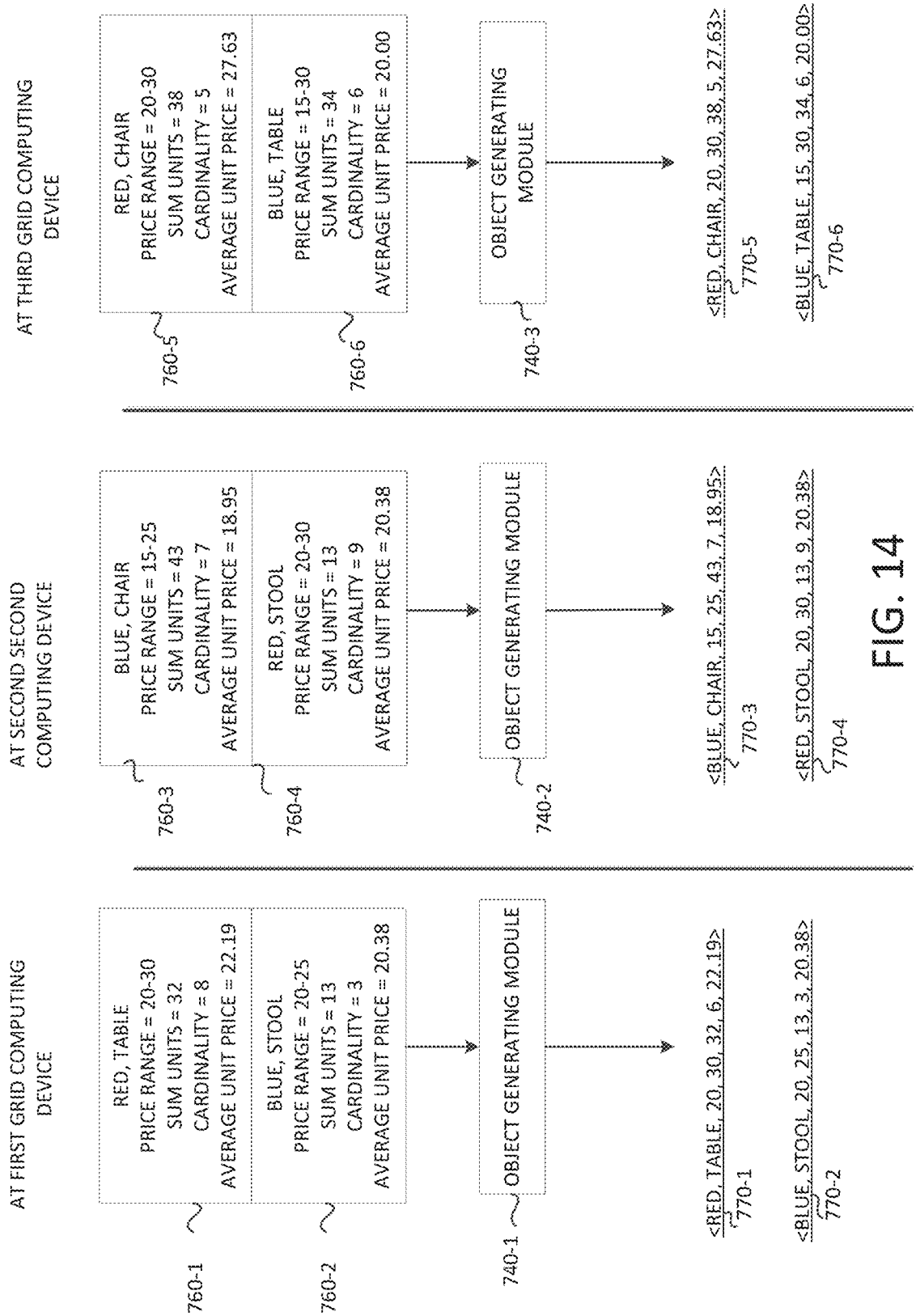

After the first, second, and third grid computing devices generate summaries 760-1, 760-2, . . . , 760-3 of the aggregate group-by subsets as explained above, the grid computing devices use the summary information to generate objects that represent the aggregate group-by subsets. FIG. 14 depicts the generation of objects at the first, second, and third grid-computing devices. Much like the synthesis of statistical summaries, the generation of objects may also be distributed in the grid-computing system, and FIG. 14 represents this manner of computational load sharing.

For example, an object-generating module 740-1 is executed by the first-grid computing device. The object-generating module 740-1 generates and stores an object 770-1 based on the statistical summary 760-1. The object-generating module 740-1 also generates and stores a separate object 770-2 based on the statistical summary 760-2.

An object-generating module 740-2 is executed by the second grid-computing device. Object-generating module 740-2 generates and stores objects 770-3 and 770-4 based on statistical summaries 760-3 and 760-4, respectively. Also, the third grid-computing device generates and stores objects 770-5 and 770-6 based on statistical summaries 740-5 and 740-6, respectively.

Subsequent to the generation of objects 770-1, 770-2, . . . , 770-6, a central controller (not depicted) in the grid-computing system may receive commands to perform any number and variety of statistical analysis of data set 410 or of subsets of data set 410. When a central controller receives a command to perform a statistical analysis, it may identify the aggregate group-by subsets of data set 410 that are relevant to the analysis to be performed. The central processing device may then query the first, second and third grid computing devices for the objects that represent these group-by subsets. The querying may be performed using query criterion.

The process of querying and formatting querying criteria in the grid-computing context is generally similar to querying in the context of a single-computing device, except that multiple grid-computing devices may be queried for relevant objects. For this reason, the depiction of querying shown at 620-1, 620-2, and 620-3 in FIG. 8 is generally relevant to understanding querying in a grid-computing system such as the system to which FIGS. 9-14 are directed.

However, although not depicted in FIGS. 9-14, it is important to note that a central controller may format particularized queries to limit the processing entailed by retrieving relevant objects at grid-computing device. For example, the central controller may use the addressing scheme of FIG. 11 to determine relevant objects stored at the first grid-computing device. Based on this information, the central controller may format a particularized query for retrieving those relevant objects which the first grid-computing device stores, but not relevant objects stored elsewhere. The central processing device may then repeat this process in querying the second grid-computing device and third-computing device.

In response to a query, whether generalized or particularized, the first, second, and third grid-computing devices may retrieve any stored objects which satisfy the criteria specified in the received query. The first, second, and third grid-computing devices may then forward copies of retrieved objects to the central processing device.

Alternatively, the grid-computing devices may copy relevant identity or statistical summary information from retrieved objects, and forward the copied information to the central processing device. By parsing retrieved objects and forwarding necessary information obtained from the objects, the grid-computing devices may effectively parallelize some of the statistical processing that otherwise would be performed at the central processing device. This technique may also reduce bottlenecks and reduce the channel capacity required for the grid-computing devices to respond to queries.

FIG. 15 depicts one example of a sequence of operations described by this disclosure. At 804, a computing device accesses a data set that includes multiple entries, each of the entries including data with respect to multiple variables. At 806, the computing device groups the multiple entries into group-by subsets, wherein group-by subsets are formed using two or more group-by variables, and wherein the group-by subsets are subsets of the data set. At 808, the computing device determines cardinality data for each of the group-by subsets, wherein cardinality data represents a number of entries in a group-by subset.

At 810, the computing device generates at least one summary of the data in each of the group-by subsets, wherein each of the summaries includes the number of entries in a group-by subsets. At 812, the computing device initializes and stores an object for each of the group-by subsets, wherein an object includes the cardinality data and the summary data, and wherein an object identifies values of the group-by variables that form the group-by subset. At 814, the computing device generates multiple statistical summaries of the data set using the stored objects.

The methods, systems, devices, implementations, and embodiments discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session.

Specific details are given in the description to provide a thorough understanding of examples of configurations (including implementations). However, configurations may be practiced without these specific details. For example, well-known circuits, processes, algorithms, structures, and techniques have been shown without unnecessary detail in order to avoid obscuring the configurations. This description provides examples of configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several examples of configurations, various modifications, alternative constructions, and equivalents may be used without departing from the spirit of the disclosure. For example, the above elements may be components of a larger system, wherein other rules may take precedence over or otherwise modify the application of the current disclosure. Also, a number of steps may be undertaken before, during, or after the above elements are considered. Accordingly, the above description does not bound the scope of the claims.

The use of "capable of", "adapted to", or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A computer-program product tangibly embodied in a non-transitory machine-readable storage medium, the storage medium having instructions stored thereon, and the instructions being operable to cause a data-processing apparatus to perform operations including:
   accessing a data set that includes multiple entries, each of the entries including data corresponding to multiple variables;
   grouping the multiple entries into group-by subsets, wherein the group-by subsets are formed on two or more group-by variables, and wherein the group-by subsets include multiple disjoint subsets of the data set, multiple intersecting subsets of the data set, or multiple subsets of the data set which are formed on different combinations of group-by variables;
   displaying an interface that facilitates defining a subset of the data set by referencing one or more of the group-by subsets;
   receiving an input at the interface, the input defining a subset of the data set by referencing at least one of the group-by subsets;
   generating a statistical summary of the defined subset;
   determining cardinality data for each of the group-by subsets, wherein cardinality data represents a number of entries in a group-by subset;
   generating at least one summary of data in each of the group-by subsets, wherein each of the summaries includes the cardinality data determined for the group-by subset;
   initializing objects for the group-by subsets, wherein each of the objects include the cardinality data and the at least one summary, and wherein each of the objects includes values of the group-by variables used in forming the group-by subset; and
   generating multiple statistical summaries of the data set using the objects.

2. The computer-program product of claim 1, wherein the multiple statistical summaries include a histogram that represents a variable distribution with respect to the group-by subsets.

3. The computer-program product of claim 1, wherein the data set is partitioned and distributed amongst multiple grid-computing devices in a grid-computing system, and wherein grouping the multiple entries into the group-by subsets includes using parallel processing involving at least two of the grid-computing devices to form at least one of the group-by subsets.

4. The computer-program product of claim 3, wherein the data set is partitioned such that the at least one of the group-by subsets is formed by identifying constituent subsets stored in a distributed manner.

5. The computer-program product of claim 4, wherein the constituent subsets are statistically summarized individually, and wherein generating at least one summary of data in each of the group-by subsets includes synthesizing statistical summaries of the constituent subsets.

6. The computer-program product of claim 3, wherein the operations further include:
   using the grid-computing devices to store the objects, wherein the objects are stored in a distributed manner across the grid-computing system.

7. The computer-program product of claim 6, wherein storage locations of the objects are determined by a hash function that involves a modular operation.

8. The computer-program product of claim 7, wherein the hash function maps multiple combinations of group-by variables to integers, and wherein each of the integers represents a storage location.

9. The computer-program product of claim 1, wherein the objects are initialized in accordance with a shared organizational scheme that facilitates referencing the cardinality data and the summaries included in the objects.

10. The computer-program product of claim 1, wherein the interface further facilitates defining a subset of the data set by using logical operators to indicate a union of group-by subsets or an intersection of group-by subsets.

11. A system comprising:
one or more processors configured to perform operations that include:
accessing a data set that includes multiple entries, each of the entries including data corresponding to multiple variables;
grouping the multiple entries into group-by subsets, wherein the group-by subsets are formed on two or more group-by variables, and wherein the group-by subsets include multiple disjoint subsets of the data set, multiple intersecting subsets of the data set, or multiple subsets of the data set which are formed on different combinations of group-by variables;
displaying an interface that facilitates defining a subset of the data set by referencing one or more of the group-by subsets;
receiving an input at the interface, the input defining a subset of the data set by referencing at least one of the group-by subsets;
generating a statistical summary of the defined subset;
determining cardinality data for each of the group-by subsets, wherein cardinality data represents a number of entries in a group-by subset;
generating at least one summary of data in each of the group-by subsets, wherein each of the summaries includes the cardinality data determined for the group-by subset;
initializing objects for the group-by subsets, wherein each of the objects include the cardinality data and the at least one summary, and wherein each of the objects includes values of the group-by variables used in forming the group-by subset; and
generating multiple statistical summaries of the data set using the objects.

12. The system of claim 11, wherein the multiple statistical summaries include a histogram that represents a variable distribution with respect to the group-by subsets.

13. The system of claim 11, wherein the data set is partitioned and distributed amongst multiple grid-computing devices in a grid-computing system, and wherein grouping the multiple entries into the group-by subsets includes using parallel processing involving at least two of the grid-computing devices to form at least one of the group-by subsets.

14. The system of claim 13, wherein the data set is partitioned such that the at least one of the group-by subsets is formed by identifying constituent subsets stored in a distributed manner.

15. The system of claim 14, wherein the constituent subsets are statistically summarized individually, and wherein generating at least one summary of data in each of the group-by subsets includes synthesizing statistical summaries of the constituent sub sets.

16. The system of claim 13, wherein the operations further include:
using the grid-computing devices to store the objects, wherein the objects are stored in a distributed manner across the grid-computing system.

17. The system of claim 16, wherein storage locations of the objects are determined by a hash function that involves a modular operation.

18. The system of claim 17, wherein the hash function maps multiple combinations of group-by variables to integers, and wherein each of the integers represents a storage location.

19. The system of claim 11, wherein the objects are initialized in accordance with a shared organizational scheme that facilitates referencing the cardinality data and the summaries included in the objects.

20. The system of claim 11, wherein the interface further facilitates defining a subset of the data set by using logical operators to indicate a union of group-by subsets or an intersection of group-by subsets.

21. A method comprising:
accessing a data set that includes multiple entries, each of the entries including data corresponding to multiple variables;
grouping the multiple entries into group-by subsets, wherein the group-by subsets are formed on two or more group-by variables, and wherein the group-by subsets include multiple disjoint subsets of the data set, multiple intersecting subsets of the data set, or multiple subsets of the data set which are formed on different combinations of group-by variables;
displaying an interface that facilitates defining a subset of the data set by referencing one or more of the group-by subsets;
receiving an input at the interface, the input defining a subset of the data set by referencing at least one of the group-by subsets;
generating a statistical summary of the defined subset;
determining cardinality data for each of the group-by subsets, wherein cardinality data represents a number of entries in a group-by subset;
generating at least one summary of data in each of the group-by subsets, wherein each of the summaries includes the cardinality data determined for the group-by subset;
initializing objects for the group-by subsets, wherein each of the objects include the cardinality data and the at least one summary, and wherein each of the objects includes values of the group-by variables used in forming the group-by subset; and
generating multiple statistical summaries of the data set using the objects.

22. The method of claim 21, wherein the multiple statistical summaries include a histogram that represents a variable distribution with respect to the group-by subsets.

23. The method of claim 21, wherein the data set is partitioned and distributed amongst multiple grid-computing devices in a grid-computing system, and wherein grouping the multiple entries into the group-by subsets includes using parallel processing involving at least two of the grid-computing devices to form at least one of the group-by subsets.

24. The method of claim 23, wherein the data set is partitioned such that the at least one of the group-by subsets is formed by identifying constituent subsets stored in a distributed manner.

25. The method of claim 24, wherein the constituent subsets are statistically summarized individually, and wherein generating at least one summary of data in each of the group-by subsets includes synthesizing statistical summaries of the constituent sub sets.

26. The method of claim 23, further comprising:
using the grid-computing devices to store the objects, wherein the objects are stored in a distributed manner across the grid-computing system.

27. The method of claim 26, wherein storage locations of the objects are determined by a hash function that involves a modular operation.

28. The method of claim 27, wherein the hash function maps multiple combinations of group-by variables to integers, and wherein each of the integers represents a storage location.

29. The method of claim 21, wherein the objects are initialized in accordance with a shared organizational scheme that facilitates referencing the cardinality data and the summaries included in the objects.

30. The method of claim 21, wherein the interface further facilitates defining a subset of the set of data by using logical operators to indicate a union of group-by subsets or an intersection of group-by subsets.

* * * * *